(12) United States Patent
Harashina et al.

(10) Patent No.: US 7,928,184 B2
(45) Date of Patent: Apr. 19, 2011

(54) UNSTABLE TERMINAL GROUP DECOMPOSER, AND STABILIZED POLYACETAL RESIN, MANUFACTURING METHOD, COMPOSITION AND MOLDED ARTICLE USING THE SAME

(75) Inventors: Hatsuhiko Harashina, Fuji (JP); Hiroaki Nakao, Fuji (JP)

(73) Assignee: Polyplastics Co., Ltd., Tokyo (JP)

( * ) Notice: Subject to any disclaimer, the term of this patent is extended or adjusted under 35 U.S.C. 154(b) by 448 days.

(21) Appl. No.: 11/886,153

(22) PCT Filed: Mar. 7, 2006

(86) PCT No.: PCT/JP2006/304840
§ 371 (c)(1),
(2), (4) Date: Feb. 25, 2008

(87) PCT Pub. No.: WO2006/098251
PCT Pub. Date: Sep. 21, 2006

(65) Prior Publication Data
US 2008/0200639 A1    Aug. 21, 2008

(30) Foreign Application Priority Data

| Mar. 15, 2005 | (JP) | 2005-073629 |
| Mar. 31, 2005 | (JP) | 2005-104235 |
| Apr. 21, 2005 | (JP) | 2005-123658 |

(51) Int. Cl.
*C08C 1/14* (2006.01)

(52) U.S. Cl. ............ 528/486; 428/524; 525/88; 525/95; 525/98; 525/154; 525/155; 525/232; 525/237; 525/398; 525/402; 528/230; 528/239; 528/425; 528/480; 528/489; 528/491; 528/199; 528/492; 528/493

(58) Field of Classification Search .................... 525/88, 525/95, 98, 154, 155, 232, 237, 402, 398; 528/230, 239, 489, 491, 199, 425, 480, 486, 528/492, 493; 428/524
See application file for complete search history.

(56) References Cited

U.S. PATENT DOCUMENTS

| 3,405,094 A * | 10/1968 | Tanaka et al. ................ 528/492 |
| 3,718,630 A * | 2/1973 | Leverett ..................... 525/400 |
| 6,365,655 B1 | 4/2002 | Tanimura et al. |
| 6,506,850 B1 * | 1/2003 | Tanimura et al. ............ 525/398 |
| 2001/0007006 A1 * | 7/2001 | Tanimura et al. ............ 525/398 |
| 2005/0255990 A1 * | 11/2005 | Luinstra ....................... 502/150 |

FOREIGN PATENT DOCUMENTS

| GB | 997337 | 7/1965 |
| GB | 1034282 | 6/1966 |
| JP | 40-5508 | 3/1965 |
| JP | 40-10435 | 5/1965 |
| JP | 57-055916 | 4/1982 |
| JP | 59-159812 | 9/1984 |
| JP | 59-206426 | 11/1984 |
| JP | 59-230015 | 12/1984 |
| JP | 60-063216 | 4/1985 |
| JP | 63-142015 | 6/1988 |
| JP | 10-324790 | 12/1998 |
| JP | 3087912 | 9/2000 |
| WO | 00/17247 | 3/2000 |

OTHER PUBLICATIONS

Supplemental European Search Report, Oct. 20, 2010.

* cited by examiner

*Primary Examiner* — Ling-Siu Choi
*Assistant Examiner* — Robert Jones
(74) *Attorney, Agent, or Firm* — Nixon & Vanderhye P.C.

(57) ABSTRACT

The present invention provides a method of manufacturing a stabilized polyacetal resin, comprising the step of applying a heat treatment to a polyacetal resin having an unstable terminal group in the presence of an unstable terminal group decomposer selected from the following Group I, Group II and Group III, thereby decreasing the unstable terminal group:

unstable terminal group decomposer of Group I:
  (I) a quaternary ammonium salt of an acidic cyclic amide compound,
unstable terminal group decomposer of Group II:
  (II) a quaternary ammonium salt of a polycarboxylic acid intramolecularly having four or more carboxyl groups and/or a quaternary ammonium salt of an aminocarboxylic acid intramolecularly having one or more carboxyl group(s),
unstable terminal group decomposer of Group III:
  (III) a quaternary ammonium salt, wherein a compound providing a counter-anion of a quaternary ammonium salt is at least one selected from the group consisting of the following (i) to (v):
  (i) a carbonic acid monoester and/or a metal bicarbonate,
  (ii) an acidic enol-based compound,
  (iii) a phenol-based and/or an alcohol-based compound,
  (iv) an acidic azole-based compound, and
  (v) at least one non-carboxylic acid-based compound selected from the group consisting of an organic sulfur compound, an organic phosphorus compound and an organic boron compound.

33 Claims, No Drawings

UNSTABLE TERMINAL GROUP DECOMPOSER, AND STABILIZED POLYACETAL RESIN, MANUFACTURING METHOD, COMPOSITION AND MOLDED ARTICLE USING THE SAME

This application is the US national phase of international application PCT/JP2006/304840 filed 7 Mar. 2006 which designated the U.S. and claims benefit of JP 2005-073629; JP 2005-104235; JP 2005-123658, dated 15 Mar. 2005; 31 Mar. 2005; 21 Apr. 2004, respectively, the entire content of each of which is hereby incorporated by reference.

Unstable terminal group decomposer, and stabilized polyacetal resin, manufacturing method, composition and molded article using the same

TECHNICAL FIELD

The present invention relates to an unstable terminal group decomposer composed of the specified quaternary ammonium salt, a method of manufacturing a stabilized polyacetal resin, which decreases the amount of the unstable terminal group, through a heat treatment in the presence of the decomposer, thus obtained stabilized polyacetal resin, and the composition and molded article thereof.

BACKGROUND ART

Polyacetal resins have excellent balances in, for example, mechanical properties, resistance to chemicals, sliding property, and further superior workability as well, thereby they are widely used as an engineering plastic material in a variety of machine parts centering on electric and electronic components and automobile parts.

Polyacetal resins have two types: homopolymers and copolymers. Homopolymers are prepared by a step of polymerizing formaldehyde or a cyclic polymer thereof as the material, while for copolymers, formaldehyde or a cyclic polymer thereof as main monomer and further cyclic ether and/or cyclic formal as comonomer, in the presence of catalyst. However, the obtained polyacetal resins contain hemiacetal group or formyl group as a part of the terminal groups, causing them thermally unstable, so that they are thermally decomposed in molding stage to generate formaldehyde. The generated formaldehyde causes environmental and other problems, such as formic acid formation by oxidation in molding, resulting in decomposing the polyacetal resin, foaming the molded article and inducing degassing to generate silver-lines in the molded article.

To stabilize the polyacetal resins having that thermally unstable terminal group, there are known methods such as the one to acetilate, etherify, or urethanate the terminal, and the one to decompose the unstable terminal part. For copolymers, a stabilization method through decomposition of unstable terminal group is adopted.

There are various known methods to decompose the unstable terminal group.

JP-B-40-10435, particularly in Claims thereof, discloses a method of direct heat treatment of a crude polyacetal resin in an insoluble medium.

The disclosed method, however, required the operation at a temperature close to the melting point of the polyacetal resin to increase the decomposition rate of the unstable terminal group, and also took a long reaction time.

JP-A-60-63216, particularly in Claims 1 to 9 thereof, discloses a method in which a stabilizer and/or an alkaline material is added to a crude polyacetal resin, the mixture is treated by melting, and then the mixture is subjected to heat treatment in an insoluble medium at 80° C. or higher temperature.

The disclosed method, however, raises a problem of large amount of unstable terminal groups left behind.

Conventionally, to enhance the decomposition of unstable terminal group, it is known that the decomposition of unstable terminal part is conducted in the presence of: ammonia; aliphatic amines such as triethylamine, tri-n-butylamine or triethanolamine; quaternary ammonium salts such as tetrabutyl ammonium hydroxide; hydroxide of alkali metal or alkaline earth metal; inorganic weak acid salt; organic acid salt; and the like.

GB-A 1034282, particularly in Claims and Example 8 thereof, discloses a method of obtaining a stabilized polyacetal copolymer through the heating and melting treatment of a crude polyacetal copolymer in a solvent in the presence of a tetraalkyl ammonium hydroxide such as tetrabutylammonium hydroxide, thus removing the unstable terminal part from the polymer.

The disclosed method shows an effectiveness of the quaternary ammonium hydroxide as the unstable terminal decomposer to the crude polyacetal copolymer. The quaternary ammonium hydroxide is, however, a strong base, and has problems in the handling easiness and the hue of the polymer after stabilization. Furthermore, the patent publication does not disclose quaternary ammonium salts other than the quaternary ammonium hydroxide.

JP-A 57-55916, particularly in page 6, from line 15 of the lower left-handed column to line 3 of the lower right-handed column thereof, discloses a method of obtaining a crude polyacetal copolymer by copolymerizing a polyoxymethylene homopolymer with a cyclic formal using Lewis acid as the polymerization catalyst. The disclosure describes that after the completion of the reaction by the addition of a basic material such as amine or quaternary ammonium salt, the stabilized polyacetal copolymer is obtained by heating the polymer together with water and the like.

Although the disclosed method shows the effectiveness of the quaternary ammonium salt as the unstable terminal decomposer, the disclosure does not give examples of the quaternary ammonium salt.

JP-A 59-159812, particularly in page 5, lines 5 to 12 of the lower left-handed column thereof, discloses a method of continuous polymerization of trioxane to obtain a crude polyacetal copolymer through the polymerization of trioxane with a cyclic ether using Lewis acid as the polymerization catalyst. The disclosure describes that the Lewis acid is neutralized and inactivated by a basic material such as amine or quaternary ammonium salt, and then the polymer is heated together with water and the like, thereby removing unstable terminal part from the polymer to obtain the stabilized polyacetal copolymer.

Although the disclosed method shows the effectiveness of the quaternary ammonium salt as the unstable terminal decomposer, the disclosure does not show a detailed material structure of the quaternary ammonium salt.

JP-B 3087912, particularly in Claims 1 to 22, Column 11 lines 32 to 50, Examples 1 to 148 thereof, discloses a method of stabilizing oxymethylene copolymer, in which an oxymethylene copolymer having a thermally unstable terminal part is subjected to heat treatment in the presence of a specified quaternary ammonium salt represented by the formula $[R^1R^2R^3R^4N^+]_n X^{-n}$.

As the counter-anion species in the quaternary ammonium salt described in the patent, the disclosure gives examples of specified acidic compounds such as aliphatic carboxylate, and in particular, gives lower fatty acids such as formic acid and acetic acid in Examples as preferred counter-anion species. The above quaternary ammonium salts are effective unstable terminal decomposers, and give favorable decomposition of terminal group. Since, however, the lower fatty acid, which is a typical component of the counter-anion, remains in the polymer as an acid radical to a significant amount, the lower fatty acid induces adverse effects not only to the safety as acid but also in terms of odor of polymer after stabilizing treatment and especially the thermal stability of the polymer itself concerning a formic acid radical. Furthermore, if the polymer is applied together with other resins such as polycarbonate resin, the quaternary ammonium salt according to the patent significantly accelerates the deterioration of the other resins.

JP-A 10-324790, particularly in Claim 1 and Paragraph 0006 thereof, discloses and provides a polyacetal resin composition having excellent resistance to the both of heat-aging and mechanical strength. According to the disclosure, the polyacetal resin composition contains 100 parts by weight of polyacetal resin (A) and 0.001 to 2 parts by weight of sulfonic acid compound (B) represented by (HO)n-R—(SO$_3$M)$_m$, wherein n represents an integer selected from 1 to 3, m is an integer selected from 1 to 3; R is an alkylene group having 1 to 30 carbon atoms or an alkylene group having 2 to 30 carbon atoms and 1 or more ether bond; M is an element or group selected from lithium, sodium, potassium, barium, calcium, tetraalkyl phosphonium, or tetraalkyl ammonium.

The disclosed technology, however, does not describe anything other than the residual amount of the unstable terminal group and the specific quaternary ammonium salt of sulfonic acid.

As described above, according to the prior art, sometimes reduction in the residual amount of unstable terminal group was insufficient and it was difficult to find a well-balanced decomposer, further safety problems and unfavorable limitations on decomposition treatment and facilities were generated for some decomposers.

DISCLOSURE OF THE INVENTION

It is noted in the present invention to sufficiently decrease the residual amount of unstable terminal group, or to find an unstable terminal group decomposer which gives very little limitation to the treatment method, apparatus, and the amount of materials used, generates no odor on the obtained polyacetal resin and the molded article thereof, and induces no deterioration to other accompanying resins.

The present inventors have found that the problems described above would be solved by applying a heat treatment to a polyacetal resin having an unstable terminal group such as hemiacetal group or formyl group in the presence of the choline-based quaternary ammonium salt of acidic cyclic amide compound, and completed the present invention.

The present inventors have found that the problems described above would be solved by applying a heat treatment to a polyacetal resin having unstable terminal group such as hemiacetal group or formyl group in the presence of the quaternary ammonium salt of polycarboxylic and/or the quaternary ammonium salt of aminocarboxylic acid(s) and completed the present invention.

The present inventors have found that the problems described above would be solved by applying a heat treatment to a polyacetal resin having an unstable terminal group such as hemiacetal group or formyl group in the presence of an unstable terminal group decomposer, wherein a compound providing a counter-anion of a quaternary ammonium salt is at least one selected from the group consisting of the following (i) to (v):
 (i) carbonic acid monoester and/or metal bicarbonate,
 (ii) acidic enol-based compound,
 (iii) phenol-based compound and alcohol-based compound,
 (iv) acidic azole-based compound, and
 (v) at least one non-carboxylic acid-based compound selected from the group consisting of organic sulfur compound, organic phosphorus compound and organic boron compound, thereby completed the present invention.

That is, the present invention 1 provides a method of manufacturing a stabilized polyacetal resin, comprising the step of applying a heat treatment to a polyacetal resin having an unstable terminal group in the presence of an unstable terminal group decomposer selected from the following Group I, Group II and Group III, herein after simply called also (I), (II) and (III), respectively, thereby decreasing the unstable terminal group:
 unstable terminal group decomposer of Group I:
 (I) a quaternary ammonium salt of an acidic cyclic amide compound,
 unstable terminal group decomposer of Group II:
 (II) a quaternary ammonium salt of a polycarboxylic acid intramolecularly having four or more carboxyl groups and/or a quaternary ammonium salt of an aminocarboxylic acid intramolecularly having one or more carboxyl group(s),
 unstable terminal group decomposer of Group III:
 (III) a quaternary ammonium salt, wherein a compound providing a counter-anion of a quaternary ammonium salt is at least one selected from the group consisting of the following (i) to (v):
 (i) a carbonic acid monoester and/or a metal bicarbonate,
 (ii) an acidic enol-based compound,
 (iii) a phenol-based and/or an alcohol-based compound,
 (iv) an acidic azole-based compound, and
 (v) at least one non-carboxylic acid-based compound selected from the group consisting of an organic sulfur compound, an organic phosphorus compound and an organic boron compound.

The present invention further provides a polyacetal resin obtained by the above-mentioned method, a composition and molded article comprising the resin.

The present invention further provides the above-mentioned unstable terminal group decomposer of (I), (II) or (III).

DETAILED DESCRIPTION OF THE INVENTION

The present invention 2 provides the method of manufacturing a stabilized polyacetal resin according to the present invention 1, wherein the unstable terminal group decomposer of Group I is a quaternary ammonium salt represented by the following formula (1-1) below:

$$[R^1R^2R^3R^4N^+]_nY^{n-} \tag{1-1}$$

wherein, $R^1$, $R^2$, $R^3$ and $R^4$ independently represent a hydrocarbon group having 1 to 20 carbon atoms, and the hydrocarbon group is a linear or branched alkyl group, cycloalkyl group, aryl group, aralkyl group or alkylaryl group; the hydrocarbon group may have a substituent, the substituent including hydroxyl group, acyl group, acyloxy group, alkoxy group, alkoxycarbonyl group, carboxyl group, amino group, amide group, vinyl group, allyl group, hydroxyalkyloxy group, alkoxyalkyloxy group or a halogen atom; n represents an integer from 1 to 5; $Y^{n-}$ is a counter anion, whose provider compound is an acidic cyclic amide compound; and n number of [R¹R²R³R⁴N⁺]s may differ from each other.

The present invention 3 provides the method of manufacturing a stabilized polyacetal resin according to the present invention 1, wherein the unstable terminal group decomposer of Group I is a quaternary ammonium salt represented by the following formula (1-2):

[R¹R²R³R⁴N⁺]$_j$nY$^{j-}$.W$^{k-}$         (1-2)

wherein, R¹, R², R³ and R⁴ independently represent a hydrocarbon group having 1 to 20 carbon atoms, and the hydrocarbon group is a linear or branched alkyl group, cycloalkyl group, aryl group, aralkyl group or alkylaryl group; the hydrocarbon group may have a substituent, the substituent including hydroxy group, acyl group, acyloxy group, alkoxy group, alkoxycarbonyl group, carboxyl group, amino group, amide group, vinyl group, allyl group, hydroxyalkyloxy group, alkoxyalkyloxy group or a halogen atom; n represents an integer from 1 to 5; Y$^{j-}$ and W$^{k-}$ are counter anions; j+k is n; j represents an integer from 1 to 5; Y$^{j-}$ is an anion derived from an acidic cyclic amide compound; W$^{k-}$ is at least one anion selected from the group consisting of hydroxide anion, an anion(s) derived from a fatty acid having 1 to 20 carbon atoms, carbonate anion and borate anion; and n number of [R¹R²R³R⁴N⁺]s may differ from each other.

The present invention 4 provides the method of manufacturing a stabilized polyacetal resin according to any of the present inventions 1 to 3, wherein the acidic cyclic amide compound of an unstable terminal group decomposer of Group I is an acidic cyclic urea compound.

The present invention 5 provides the method of manufacturing a stabilized polyacetal resin according to any of the present inventions 1 to 3, wherein the acidic cyclic amide compound of an unstable terminal group decomposer of Group I is at least one selected from the group consisting of (iso)cyanuric acid, 5,5-dimethylhydantoin and phthalimide.

The present invention 6 provides the method of manufacturing a stabilized polyacetal resin according to the present invention 1, wherein the unstable terminal group decomposer of Group II is a quaternary ammonium salt represented by the following formula (2-1):

[R¹R²R³R⁴N⁺]$_j$nY$^{n-}$         (2-1)

wherein, R¹, R², R³ and R⁴ independently represent a hydrocarbon group having 1 to 20 carbon atoms, and the hydrocarbon group is a linear or branched alkyl group, cycloalkyl group, aryl group, aralkyl group or alkylaryl group; the hydrocarbon group may have a substituent, the substituent including hydroxy group, acyl group, acyloxy group, alkoxy group, alkoxycarbonyl group, carboxyl group, amino group, amide group, vinyl group, allyl group, hydroxyalkyloxy group, alkoxyalkyloxy group or a halogen atom; n represents an integer of 4 or more in the case of polycarboxylic acid, and 1 or more in the case of aminocarboxylic acid; Y$^{n-}$ is a counter anion, whose provider compound is a polycarboxylic or aminocarboxylic acid; n number of [R¹R²R³R⁴N⁺]s may differ from each other; and Y$^{n-}$ may be anions derived from two or more kinds of polycarboxylic acid and/or aminocarboxylic acid or double salt and complex salt thereof.

The present invention 7 provides the method of manufacturing a stabilized polyacetal resin according to the present invention 1, wherein the unstable terminal group decomposer of Group II is a quaternary ammonium salt represented by the following formula (2-2):

[R¹R²R³R⁴N⁺]$_j$nY$^{j-}$.W$^{k-}$         (2-2)

wherein, R¹, R², R³ and R⁴ independently represent a hydrocarbon group having 1 to 20 carbon atoms, and the hydrocarbon group is a linear or branched alkyl group, cycloalkyl group, aryl group, aralkyl group or alkylaryl group; the hydrocarbon group may have a substituent, the substituent including hydroxy group, acyl group, acyloxy group, alkoxy group, alkoxycarbonyl group, carboxyl group, amino group, amide group, vinyl group, allyl group, hydroxyalkyloxy group, alkoxyalkyloxy group or a halogen atom; n represents an integer of 4 or more in the case of polycarboxylic acid, and 1 or more in the case of aminocarboxylic acid; Y$^{j-}$ and W$^{k-}$ are counter anions; j+k is n; j represents an integer from 1 to 10,000; Y$^{j-}$ is an anion derived from polycarboxylic acid and/or aminocarboxylic acid; W$^{k-}$ is at least one anion selected from the group consisting of hydroxide anion, anion derived from a fatty acid having 1 to 20 carbon atoms, carbonate anion, bicarbonate anion and borate anion; and n number of [R¹R²R³R⁴N⁺]s may differ from each other.

The present invention 8 provides the method of manufacturing a stabilized polyacetal resin according to any of the present inventions 1, 6 and 7, wherein the polycarboxylic acid of an unstable terminal group decomposer of Group II is a (co)polymer composed of 1,2,3,4-butanetetracarboxylic acid or unsaturated monomer comprising a carboxyl group.

The present invention 9 provides the method of manufacturing a stabilized polyacetal resin according to the present invention 8, wherein the unsaturated monomer comprising a carboxyl group is at least one selected from the group consisting of acrylic acid, methacrylic acid, maleic acid, fumaric acid and itaconic acid.

The present invention 10 provides the method of manufacturing a stabilized polyacetal resin according to any of the present inventions 1, 6 and 7, wherein the aminocarboxylic acid of an unstable terminal group decomposer of Group II is an aminocarboxylic acid having 3 to 30 carbon atoms (in which position of the amino group substituted may be on any carbon) and may be N-substituted.

The present invention 11 provides the method of manufacturing a stabilized polyacetal resin according to any of the present inventions 1, 6 and 7, wherein the aminocarboxylic acid of an unstable terminal group decomposer of Group II is an optionally N-substituted aminoacetic acid.

The present invention 12 provides the method of manufacturing a stabilized polyacetal resin according to any of the present inventions 1, 6, 7 and 10, wherein the aminocarboxylic acid of an unstable terminal group decomposer of Group II has two or more carboxyl groups intramolecularly.

The present invention 13 provides the method of manufacturing a stabilized polyacetal resin according to any of the present inventions 1, 6, 7 and from 10 to 12, wherein the aminocarboxylic acid of an unstable terminal group decomposer of Group II is at least one selected from the group consisting of nitrilotriacetic acid, ethylenediaminetetraacetic acid, diethylenetriaminepentaacetic acid, triethylenediaminehexacetic acid, 1,3-propanediaminetetraacetic acid, glycoletherdiaminetetraacetic acid, dicarboxymethylglutamic acid, ethylenediaminedisuccinic acid, hydroxyethylethylenediaminetriacetic acid, 1,3-diamino-2-hydroxypropanetetraacetic acid and hydroxyethyliminodiacetic acid.

The present invention 14 provides the method of manufacturing a stabilized polyacetal resin according to the present invention 1, wherein the unstable terminal group decomposer of Group III is a quaternary ammonium salt represented by the following formula (3-1) below:

[R¹R²R³R⁴N⁺]$_j$nY$^{n-}$         (3-1)

wherein, R¹, R², R³ and R⁴ independently represent a hydrocarbon group having 1 to 20 carbon atoms, and the hydrocarbon group is a linear or branched alkyl group, cycloalkyl group, aryl group, aralkyl group or alkylaryl group; the hydrocarbon group may have a substituent, the substituent including hydroxyl group, acyl group, acyloxy group, alkoxy group, alkoxycarbonyl group, carboxyl group, amino group, amide group, vinyl group, allyl group, hydroxyalkyloxy group, alkoxyalkyloxy group or a halogen atom; n represents an integer of one or more; n number of $[R^1R^2R^3R^4N^+]$s may differ from each other;

$Y^{n-}$ is a counter-anion, whose provider compound is at least one selected from the group consisting of the following (i) to (v):

(i) a carbonic acid monoester and/or metal bicarbonate,
(ii) an acidic enol-based compound,
(iii) a phenol-based compound and/or alcohol-based compound,
(iv) an acidic azole-based compound, and
(v) at least one non-carboxylic acid-based compound selected from the group consisting of organic sulfur compound, organic phosphorus compound and organic boron compound.

The present invention 15 provide the method of manufacturing a stabilized polyacetal resin according to the present invention 1, wherein the unstable terminal group decomposer of Group III is a quaternary ammonium salt represented by the following formula (3-2):

wherein, $R^1$, $R^2$, $R^3$ and $R^4$ independently represent a hydrocarbon group having 1 to 20 carbon atoms, and the hydrocarbon group is a linear or branched alkyl, cycloalkyl group, aryl group, aralkyl group or alkylaryl group; the hydrocarbon group may have a substituent, the substituent including hydroxy group, acyl group, acyloxy group, alkoxy group, alkoxycarbonyl group, carboxyl group, amino group, amide group, vinyl group, allyl group, hydroxyalkyloxy group or alkoxyalkyloxy groups or a halogen atom; n represents an integer of one or more; $Y^{j-}$ and $W^{k-}$ are counter anions; j+k is n; j represents an integer of one or more;

$Y^{j-}$ is a counter anion, whose provider compound is at least one selected from the group consisting of the following (i) to (v):

(i) a carbonic acid monoester and/or metal bicarbonate,
(ii) an acidic enol-based compound,
(iii) a phenol-based compound and/or alcohol-based compound,
(iv) an acidic azole-based compound, and
(v) at least one non-carboxylic acid-based compound selected from the group consisting of organic sulfur compound, organic phosphorus compound and organic boron compound;

$W^{k-}$ is at least one anion selected from the group consisting of hydroxide anion, an anion derived from a fatty acid having 1 to 20 carbon atoms, carbonate anion, bicarbonate anion and borate anion;

n number of $[R^1R^2R^3R^4N^+]$s may differ from each other.

The present invention 16 provides the method of manufacturing a stabilized polyacetal resin according to any of the present inventions 1, 14 and 15, wherein the above-mentioned carbonic acid monoester and/or metal bicarbonate (i) is at least one selected from the group consisting of carbonic acid monoalkyl ester, alkali metal bicarbonate and alkaline earth metal bicarbonate.

The present invention 17 provides the method of manufacturing a stabilized polyacetal resin according to any of the present inventions 1, 14 and 15, wherein the above-mentioned phenol-based compound and/or alcohol-based compound (iii) is at least one selected from the group consisting of aromatic mono-ol compound, diol compound and polyol compound, monoalcohol compound, dialcohol compound and polyalcohol compound.

The present invention 18 provides the method of manufacturing a stabilized polyacetal resin according to any of The present inventions 1, 14 and 15, wherein the above-mentioned acidic enol-based compound (II) is at least one selected from the group consisting of 1,3-diketone and ene-diol compounds.

The present invention 19 provides the method of manufacturing a stabilized polyacetal resin according to any of the present inventions 1, 14 and 15, wherein the above-mentioned acidic azole-based compound (iv) is at least one selected from the group consisting of tetrazole, benzotriazole and xanthine compounds.

The present invention 20 provides the method of manufacturing a stabilized polyacetal resin according to any of the present inventions 1, 14 and 15, wherein the above-mentioned non-carboxylic acid-based compound (v) is at least one selected from the group consisting of organic sulfonic acid compounds, organic phosphonic acid compound, organic phosphonous acid compound, organic phosphinic acid compound, organic phosphinous acid compound, organic boric acid compound and organic borate tetraester compound.

The present invention 21 provides the method of manufacturing a stabilized polyacetal resin according to any of the present inventions 2 to 20, wherein the $R^1$, $R^2$, $R^3$ and $R^4$ of the above-mentioned formulae from (1-1) to (3-2) consist of an alkyl group having 1 to 4 carbon atom(s) and/or a hydroxyalkyl group having 2 to 4 carbon atoms.

The present invention 22 provides the method of manufacturing a stabilized polyacetal resin according to any of the present inventions 2 to 21, wherein the $R^1R^2R^3R^4N$ is at least one selected from the group consisting of (2-hydroxyethyl)trimethylammonium, (2-hydroxyethyl)triethylammonium and tetramethylammonium.

The present invention 23 provides the method of manufacturing a stabilized polyacetal resin according to any of the present inventions 1 to 22, wherein the polyacetal resin is a polyoxymethylene copolymer obtained by the step of copolymerizing trioxane as the main monomer with cyclic ether and/or cyclic formal as comonomer in the presence of a cationic polymerization catalyst.

The present invention 24 provides the method of manufacturing a stabilized polyacetal resin according to any of the present inventions 1 to 23, further comprises the step of adding at least one selected from the group consisting of water, antioxidant, tertiary amine, alkaline-earth metal compounds and boric acid, thereby applying a heat treatment under a co-presence thereof.

The present invention 25 provides the method of manufacturing a stabilized polyacetal resin according to any of the present inventions 1 to 24, wherein the amount of hemiacetal terminal group is 0.6 mmol/kg or less and/or the amount of formyl terminal group is 0.6 mmol/kg or less in the stabilized polyacetal resin.

The present invention 26 provides the method of manufacturing a stabilized polyacetal resin according to any of the present inventions 1 to 25, wherein the heat treatment is conducted in a molten state of the polyacetal resin having an unstable terminal group.

The present invention 27 provides the method of manufacturing a stabilized polyacetal resin according to any of the present inventions 1 to 26, wherein the amount of the unstable terminal group decomposer used is calculated on the basis of a nitrogen atom providing a quaternary ammonium at 0.005 to 3.5 mmol per kg of polyacetal resin having an unstable terminal group.

The present invention 28 provides the method of manufacturing a stabilized polyacetal resin according to any of the present inventions 1 to 27, wherein the heat treatment temperature is between the melting point of polyacetal resin and 250° C., and the heat treatment time is from 20 seconds to 20 minutes.

The present invention 29 provides an unstable terminal group decomposer for the polyacetal resin selected from the group consisting of the quaternary ammonium salt of an acidic cyclic amide compound according to the present invention 2 or 3; the quaternary ammonium salt of a polycarboxylic and/or aminocarboxylic acid(s) according to the present inventions 6 and 7; and the quaternary ammonium salt according to any of the present inventions 14 to 20.

The present invention 30 provides a stabilized polyacetal resin obtained by the method of manufacturing a stabilized polyacetal resin according to any of the present inventions 1 to 28.

The present invention 31 provides a polyacetal resin composition comprising:

(a) between 0.001 and 5 parts by weight of at least one selected from the group consisting of antioxidant, formaldehyde scavenger, formic acid scavenger, weather resistant stabilizers, light resistant stabilizer, mold release agent and crystal nucleator;

(b) between 0 and 100 parts by weight of at least one selected from the group consisting of filler, reinforcing agent, thermoplastic resin, thermoplastic elastomer, lubricant, sliding agent and electric conduction agent; and (c) between 0 and 5 parts by weight of colorant, to 100 parts by weight of the stabilized polyacetal resin according to the present invention 30.

The present invention 32 provides the polyacetal resin composition according to claim 31, comprising as antioxidant hindered phenol-based antioxidant and/or amine-based antioxidant between 0.01 and 1 part by weight to 100 parts by weight of the stabilized polyacetal resin.

The present invention 33 provides the polyacetal resin composition according to the present invention 31 or 32, comprising as formaldehyde scavenger at least one selected from the group consisting of aminotriazine compound, urea compound, carboxylic acid hydrazide compound and a polyamide resin between 0.01 and 2 parts by weight to 100 parts by weight of the stabilized polyacetal resin.

The present invention 34 provides the polyacetal resin composition according to any of the present inventions 31 to 33, comprising as formic acid scavenger one or more material selected from the group consisting of fatty acid metal salt which may have a hydroxyl group, magnesium hydroxide and magnesium oxide, which may have a hydroxy group, between 0.01 and 0.2 part by weight to 100 parts by weight of the stabilized polyacetal resin.

The present invention 35 provides the polyacetal resin composition according to any of the present inventions 31 to 34, comprising as mold release agent one or more selected from the group consisting of fatty acid ester and fatty acid amide each having 12 to 36 carbon atoms between 0.01 and 1.0 part by weight to 100 parts by weight of the stabilized polyacetal resin.

The present invention 36 provides a molded article prepared by molding the polyacetal resin composition according to any of the present inventions 31 to 35.

The present invention 37 provides the molded article according to the present invention 36, wherein (1) when keeping the molded article in a sealed space at 80° C. for 24 hours, the amount of formaldehyde generated is 2 μg or less per 1 $cm^2$ of surface area of the molded article, and/or (2) when keeping the molded article in a sealed space at 60° C. for three hours under saturated humidity, the amount of formaldehyde generated is 0.8 μg or less per 1 $cm^2$ of surface area of the molded article.

The present invention 38 provides the molded article according to the present invention 36 or 37, wherein the molded article is at least one selected from automobile parts, electric and electronic components, building materials and piping parts, livingware parts, cosmetic parts and medical article parts.

According to the present invention, a defined unstable terminal group decomposer can sufficiently decrease the residual amount of the unstable terminal group in a polyacetal resin. Further, the unstable terminal group decomposer according to the present invention assures high safety and gives little unfavorable limitation to the method of decomposition treatment, the apparatus, and the amount of materials used. Furthermore, the obtained polyacetal resin or the molded articles thereof generate little odor, and other accompanying resins such as polycarbonate resin induce very little deterioration and coloration.

Hereinafter, the present invention is below described more in detail together with preferable embodiments.

Polyacetal Resin

The polyacetal resin applied to the present invention is not limited in particular to the basic molecular structure, and the polyacetal resin includes all the known polyacetal resins as follows: copolymers having an oxymethylene unit, which is prepared by the polymerization of formaldehyde or a cyclic acetal such as trioxane of a cyclic trimer of formaldehyde, as the major structural unit and a comonomer component such as ethylene oxide, propyleneoxide, styrene oxide, oxetane, 1,3-dioxolan, diethyleneglycol formal, 1,4-butanediol formal, 1,3,5-trioxepan or 1,3-dioxane; multiple copolymers prepared by the copolymerization of multicomponent monomers containing a compound having 1 to 4 glycidyl group(s) (such as ethylglycidyl ether, butylglycidyl ether, 2-ethylhexylglycidyl ether, phenylglycidyl ether, 1,4-butanediol diglycidyl ether, hexamethyleneglycol diglycidyl ether, bisphenol-A diglycidyl ether, glycerin mono- to triglycidyl ether, trimethylolpropane mono- to triglycidyl ether, pentaerythritol mono- to tetraglycidyl ether, dipentaerythritol mono- to hexaglycidyl ether, (poly) ethyleneglycol diglycidyl ether, (poly) propyleneglycol diglycidyl ether or (poly)tetramethyleneglycol diglycidyl ether); multiple copolymers having a branched or cross-linked structure (particularly a terpolymer); and polymers introducing block components. Among them, copolymer and terpolymer are preferred. Other than above, mixtures of copolymers and multiple copolymers having a branched or cross-linked structure, (particularly a terpolymer), at an arbitrary mixing ratio may be applied.

The content of the comonomer is preferably from 0.01 to 20 mole %, and more preferably from 0.1 to 18 mole %, to the amount of trioxane.

Applicable polymerization catalysts for manufacturing the polyacetal resin from the raw materials described above includes Lewis acids, protonic acids, metal salts thereof, and cationic active polymerization catalysts of esters, anhydrides or the like. Examples of the Lewis acids are halides of boric acid, tin, titanium, phosphorus, arsenic and antimony. Specifically boron trifluoride, tin tetrachloride, titanium tetrachloride, phosphorus pentafluoride, phosphorus pentachloride, antimony pentafluoride, and complexes or salts thereof are included in the examples. Examples of protonic acids, metal salts, esters or anhydrides thereof are: perchloric acid; perfluoroalkane sulfonic acid (anhydride) such as trifluoromethane sulfonic acid (anhydride); perfluoroalkane sulfonic acid esters such as methyl trifluoromethane sulfonate; rare earth metal salts of perfluoroalkane sulfonic acid such as scandium salt, yttrium salt or lanthanum salt of trifluoromethane sulfonic acid; metal salts of β-diketone such as bis(acetylacetone) copper or tris(acetylacetone) cobalt; trimethyloxonium hexafluorophosphate; hetero-polyacids such as phosphomolybdate, phosphotungstate, silicomolybdate or silicotungstate; isopolyacids such as isopolymolybdate, isopolytungstate or isopolyvanadate. Among them, preferred ones are boron trifluoride, boron trifluoride hydrate; coordination complexes of organic compounds containing an oxygen atom or sulfur atom with boron trifluoride; trifluoromethane sulfonate and hetero-polyacid, and specifically preferred examples are boron trifluoride, boron trifluoride diethylether, boron trifluoride di-n-butylether, trifluoromethane sulfonate, phosphomolybdate and phosphotungstate.

The amounts of these polymerization catalysts used are preferably in a range from $1\times10^{-6}$ to $1\times10^{-1}$ mole % and more preferably from $5\times10^{-6}$ to $1\times10^{-2}$ mole %, to the total amount of the trioxane and cyclic ether.

The polymerization method is not limited in particular, and batchwise or continuous polymerization can be applied. mass polymerization is preferred.

The molecular weight or the melt viscosity of the polymer is not limited if only the polymer can be melted and molded.

The unstable terminal groups of the polyacetal resin are hemiacetal terminal group (=hemiformal group (—O—CH$_2$OH)) and formyl terminal group (=formyloxy group (—OCHO)).

While, the stable terminal groups are alkoxy groups such as methoxy groups (—OCH$_3$), and hydroxyalkyl groups having 2 or more carbon atoms such as hydroxyethyl group (—CH$_2$CH$_2$OH) or hydroxybutyl group (—CH$_2$CH$_2$CH$_2$CH$_2$OH).

The methoxy group is formed by, for example, a formal, typically methylal (=methylene dimethyl ether), which is a molecular weight adjuster being added in the polymerization stage.

The terminal hydroxyalkyl groups having 2 or more carbon atoms are originated from cyclic ethers or cyclic formals which are used as comonomer, and are formed by the following steps. At the time an oxyalkylene group originated from a cyclic ether or cyclic formal polymerizes the polyacetal resin which is inserted in a repeating unit of the oxymethylene, the polymerization is stopped by a trace amount of water in the raw material, thereby forming hemiacetal terminal group. When a polyacetal resin having hemiacetal terminal group therein is subjected to heat treatment in the presence of an aqueous solution of alkaline substance, such as an aqueous solution of triethylamine, the unstable terminal group is decomposed. The decomposition proceeds from the terminal to the main chain. Once the decomposition reaches the part of oxyalkylene unit having 2 or more carbon atoms, the oxyalkylene unit in that part is converted to a stable terminal of hydroxyalkyl group.

If a large amount of terminal group of hemiacetal is left behind as the unstable terminal group, formaldehyde is successively released from the hemiacetal terminal group during compounding the stabilizer or heating in the molding, thus generating formaldehyde.

If a large amount of terminal group of formyl is left behind, the formyl terminal group is decomposed to hemiacetal terminal group during the compounding the stabilizer which requires sever processing conditions, or heating in the molding, thus generating formaldehyde.

The stabilized polyacetal resin obtained in the present invention has a content of hemiacetal terminal groups of 1 mmol/kg or less, preferably 0.8 mmol/kg or less, more preferably 0.6 mmol/kg or less, and most preferably 0.5 mmol/kg or less, and has a content of formyl terminal groups of 1 mmol/kg or less, preferably 0.8 mmol/kg or less, and more preferably 0.6 mmol/kg, and the sum of them is 1 mmol/kg or less, preferably 0.8 mmol/kg or less, and more preferably 0.6 mmol/kg or less.

Unstable Terminal Group Decomposer (I)

In the present invention, an unstable terminal group decomposer for use in decreasing the unstable terminal group (hereinafter also referred to as "decomposer" within never causing misunderstanding) is the quaternary ammonium salt of an acidic cyclic amide compound. Meanwhile, the quaternary ammonium salt of an acidic cyclic amide compound according to the present invention includes an acidic cyclic urea compound having an amide structure unit as a partial structure unit.

Unstable Terminal Group Decomposer (II)

In the present invention, the unstable terminal group decomposer for use in decreasing the unstable terminal group (hereinafter also referred to as "decomposer" within never causing misunderstanding) is a specified quaternary ammonium salt consisting of the quaternary ammonium salt of polycarboxylic and/or the quaternary ammonium salt of aminocarboxylic acid(s). The aminocarboxylic acid may be N-substituted.

Unstable Terminal Group Decomposer (III)

In the present invention, an unstable terminal group decomposer for use in decreasing the unstable terminal group (hereinafter also referred to as "decomposer" within never causing misunderstanding) is a defined quaternary ammonium salt, in which the compound for counter-anions is at least one selected from the group consisting of the following (i) to (v)

(i) carbonic acid monoester and/or metal bicarbonate, (ii) acidic enol-based compound, (iii) phenol-based compound and alcohol-based compound, (iv) acidic azole-based compound, and (v) at least one non-carboxylic acid-based compound selected from the group consisting of organic sulfur compound, organic phosphorus compound and organic boron compound.

The compound providing a counter-anion is preferably an acidic organic compound and an inorganic compound such as metal bicarbonate.

Quaternary Ammonium Salt of Acidic Cyclic Amide Compound (I)

As the quaternary ammonium salt of the acidic cyclic amide, those represented by the following formula (1-1) can be proposed, and they may be used in combination plurally.

$$[R^1R^2R^3R^4N^+]_n Y^{n-} \quad (1\text{-}1)$$

(wherein, $R^1$, $R^2$, $R^3$ and $R^4$ each independently represents a hydrocarbon group having 1 to 20 carbon atoms, and the hydrocarbon group is a linear or branched alkyl group, cycloalkyl group, aryl group, aralkyl group or alkylaryl group; the hydrocarbon group may have a substituent, the substituent including hydroxy group; acyl groups such as formyl group or acetyl group; acyloxy groups such as acetyloxy group; alkoxy groups such as methoxy group or ethoxy group; alkoxycarbonyl groups such as methoxycarbonyl group; carboxyl group; amino group; amide group; vinyl group; allyl group; hydroxyalkyloxy groups such as 2-hydroxyethyloxy group; alkoxyalkyloxy groups such as 2-methoxyethyloxy group; or halogen atoms; n represents an integer from 1 to 5; $Y^{n-}$ is a counter-anion, whose provider compound is an acidic cyclic amide compound; and n number of $[R^1R^2R^3R^4N^+]$s may differ from each other.)

Quaternary Ammonium Salt of (II)

As the quaternary ammonium salt of (II), those represented by the following formula (2-1) can be proposed, and they may be used in combination plurally.

$$[R^1R^2R^3R^4N^+]_n Y^{n-} \quad (2\text{-}1)$$

(wherein, $R^1$, $R^2$, $R^3$ and $R^4$ each independently represents a hydrocarbon group having 1 to 20 carbon atoms, and the hydrocarbon group is a linear or branched alkyl group, cycloalkyl group, aryl group, aralkyl group or alkylaryl group; the hydrocarbon group may have a substituent, the substituent including hydroxy group; acyl groups such as formyl group or acetyl group; acyloxy groups such as acetyloxy group; alkoxy groups such as methoxy group or ethoxy group; alkoxycarbonyl groups such as methoxycarbonyl group; carboxyl group; amino group; amide group; vinyl group; allyl group; hydroxyalkyloxy groups such as 2-hydroxyethyloxy group; alkoxyalkyloxy groups such as 2-methoxyethyloxy group; or halogen atoms).

n represents an integer from 1 to 5; $Y^{n-}$ is a counter-anion, whose provider compound is an acidic cyclic amide compound; and n number of $[R^1R^2R^3R^4N^+]$s may differ from each other.)

n represents an integer of 4 or more in the case of polycarboxylic acid, and 1 or more in the case of aminocarboxylic acid, and the upper limit of the number average of n is 10,000.

$Y^{n-}$ is a counter anion, whose provider compound is a polycarboxylic and/or aminocarboxylic acid.

n number of $[R^1R^2R^3R^4N^+]$s may differ from each other; and $Y^{n-}$ may be anions derived from two or more kinds of polycarboxylic acid and/or aminocarboxylic acid or double salt and complex salt thereof.

Quaternary Ammonium Salt of (III)

Applicable quaternary ammonium salt of (III) having the above counter-anion includes the ones represented by the following formula (3-1) and they may be used in combination.

$$[R^1R^2R^3R^4N^+]_n Y^{n-} \quad (3\text{-}1)$$

wherein, $R^1$, $R^2$, $R^3$ and $R^4$ each independently represents a hydrocarbon group having 1 to 20 carbon atoms, the hydrocarbon group is a linear or branched alkyl group, cycloalkyl group, aryl group, aralkyl group or alkylaryl group; the hydrocarbon group may have a substituent, the substituent including hydroxy group; acyl groups such as formyl group or acetyl group; acyloxy groups such as acetyloxy group; alkoxy groups such as methoxy group or ethoxy group; alkoxycarbonyl groups such as methoxycarbonyl group; carboxyl group, amino group, amide group, vinyl group, allyl group; hydroxyalkyloxy groups such as 2-hydroxyethyloxy groups; alkoxyalkyloxy groups such as 2-methoxyethyloxy group, or halogen atoms; n is an integer of 1 or more, and in the case of being classified into the polymer, represents an average value of 10000 or below, preferably 1000 or below, and more preferably 100 or below; $Y^{n-}$ is the above counter-anion; and n number of $[R^1R^2R^3R^4N^+]$s may differ from each other.

In the above-mentioned (I), (II) and (III), the quaternary ammonium is not limited in particular if only it has the above structure. Examples thereof are tetramethylammonium, tetraethylammonium, tetrapropylammonium, tetra-n-butylammonium, ethyltrimethylammonium, propyltrimethylammonium, cetyltrimethylammonium, tetradecyltrimethylammonium, 1,6-hexamethylene bis(trimethylammonium), decamethylene-bis-(trimethylammonium), (3-chloro-2-hydroxypropyl)trimethylammonium, (2-hydroxyethyl)trimethylammonium, (2-hydroxyethyl)triethylammonium, (2-hydroxyethyl)tripropylammonium, (2-hydroxyethyl)tri-n-butylammonium, (2-hydroxyethyl) methyldiethylammonium, (2-hydroxypropyl)trimethylammonium, (2-hydroxypropyl)triethylammonium, (3-hydroxypropyl)trimethylammonium, (3-hydroxypropyl) triethylammonium, (4-hydroxybutyl)trimethylammonium, (4-hydroxybutyl)triethylammonium, diallyl dimethylammonium, trimethylbenzylammonium, triethylbenzylammonium, tripropylbenzylammonium, tri-n-butylbenzylammonium, trimethylphenylammonium, triethylphenylammonium, bis(2-hydroxyethyl)dimethylammonium, bis(2-hydroxyethyl)diethylammonium, bis(2-hydroxypropyl)dimethylammonium, bis(2-hydroxypropyl)diethylammonium, tris(2-hydroxyethyl)methylammonium, tris(2-hydroxyethyl)ethylammonium, tris(2-hydroxypropyl) methylammonium, tris(2-hydroxpropyl)ethylammonium, tris(2-hydroxyethyl)octadecylammonium, tetrakis(hydroxymethyl)ammonium, tetrakis(methoxymethyl)ammonium, tetrakis(2-hydroxyethyl)ammonium, tetrakis(2-hydroxypropyl)ammonium, (poly(ethyleneoxide)) trimethylammonium, (poly(propyleneoxide) trimethylammonium, (poly(ethyleneoxide)) triethylammonium and (poly(propyleneoxide)) triethylammonium.

In the above-mentioned (I), $Y^{n-}$ is a counter-anion, and as a compound Y generating a counter-anion, acidic cyclic amide compounds may be proposed, which may be used in combination.

As an acidic cyclic amide compound, acidic amide compounds having an amide unit in a partial structure forming a ring may be used optionally, and in particular, acidic cyclic urea compounds such as isocyanuric acid, barbituric acid, alloxan, glycoluril, benzoimidazolone, uric acid, uracil, thymine, hydantoin, 5,5-dimethylhydantoin or allantoin; aromatic acidic cyclic amide compounds such as phthalimide or pyromellitic diimide; and acidic cyclic sulfonamide compound such as saccharin or acesulfame may be proposed.

Further, as the quaternary ammonium salt of an acidic cyclic amide compound of the present invention, double salt or complex salt such as quaternary ammonium salts represented by the following formula (1-2) below:

$$[R^1R^2R^3R^4N^+]_n Y^{j-} \cdot W^{k-} \quad (1\text{-}2)$$

(wherein, $R^1$, $R^2$, $R^3$ and $R^4$ each independently represents a hydrocarbon group having 1 to 20 carbon atoms, and the hydrocarbon group is a linear or branched alkyl group, cycloalkyl group, aryl group, aralkyl group or alkylaryl group; the hydrocarbon group may have a substituent, the substituent including hydroxy group, acyl group, acyloxy group, alkoxy group, alkoxycarbonyl group, carboxyl group, amino group, amide group, vinyl group, allyl group, hydroxyalkyloxy group or alkoxyalkyloxy group, or halogen atoms; n represents an integer from 1 to 5; $Y^{j-}$ and $W^{k-}$ are counter-anions; j+k is n; j represents an integer from 1 to 5; $Y^{j-}$ is an anion derived from an acidic cyclic amide compound; and $W^{k-}$ is at least one anion selected from the group consisting of hydroxide anion and an anion derived from a fatty acid having 1 to 20 carbon atoms, carbonate anion and borate anion) may be proposed.

In the above-mentioned (II), $Y^{n-}$ is a counter-anion, and as compound Y generating a counter-anion, polycarboxylic acid and/or aminocarboxylic acid may be proposed, and they may be used in combination.

Polycarboxylic Acid

As a polycarboxylic acid, the one intramolecularly having four or more carboxyl groups is proposed, for example, low molecular polyvalent carboxylic acids such as aliphatic polycarboxylic acid, alicyclic polycarboxylic acid and aromatic polycarboxylic acid, and polymers of unsaturated monomer comprising a carboxyl group may be proposed.

As a low molecular polyvalent carboxylic acid, 1,2,3,4-butanetetracarboxylic acid, cyclohexanetetracarboxylic acid, cyclohexanehexacarboxylic acid, pyromellitic acid, mellitic acid and the like may be proposed, and 1,2,3,4-butanetetracarboxylic acid is preferred.

As a polymer of unsaturated monomer comprising a carboxyl group, polymers of unsaturated monomer alone comprising a carboxyl group, or copolymers of the monomer with a vinyl- or olefin-based monomer may be proposed.

Polymers of monomer comprising a carboxyl group, and vinyl- or olefin-based copolymers of denatured monomer comprising a carboxyl group are, for example, telomers (adduct), oligomers and low to high molecular weight polymers. The upper limit of the weight-average molecular weight of high molecular weight polymer is 1,000,000.

As an unsaturated monomer comprising a carboxyl group for use above, (meth)acrylic acid, maleic acid, fumaric acid, itaconic acid and the like may be proposed.

As a comonomer for use in the copolymer the described above, (meth)acrylic ester, (meth)acrylonitrile, (meth)acrylamide, vinyl acetate, vinyl chloride, styrene, ethylene, propylene, butene, butadiene, dicyclopentadiene, ethylidenenorbornene, methylenenorbornene and the like may be proposed.

As a polymer of monomer comprising a carboxyl group, specifically, poly(meth)acrylic acid, (meth)acrylamide-(meth)acrylic acid copolymer, (meth)methyl acrylate-(meth) acrylic acid copolymer, (meth)acrylonitrile-(meth)acrylic acid copolymer, ethylene-(meth)acrylic acid copolymer, ethylene-propylene-(meth)acrylic acid copolymer, ethylene-(meth)ethyl acrylate-(meth)acrylic acid copolymer, vinyl acetate-(meth)acrylic acid copolymer, styrene-(meth)acrylic acid copolymer, butadiene-(meth)acrylonitrile-(meth)acrylic acid copolymer, styrene-maleic anhydride copolymer, styrene-maleic anhydride-(meth)acrylic acid copolymer, styrene-fumaric acid copolymer, styrene-fumaric acid-(meth) acrylic acid copolymer, styrene-itaconic acid copolymer, styrene-itaconic acid-(meth)acrylic acid copolymer, and also acid denatured ethylene-propylene copolymer, acid denatured ethylene-propylene-diene copolymer and the like may be proposed.

The acid denatured ethylene-propylene copolymer and acid denatured ethylene-propylene-diene copolymer are, specifically, ethylene-propylene copolymer, ethylene-propylene-diene copolymer are polymers which are denatured by an unsaturated carboxylic acid such as maleic anhydride or (meth)acrylic acid or an anhydride thereof in the presence or absence of peroxide.

Among polymers, the preferred are homopolymer of (meth)acrylic acid and copolymers between (meth)acrylic acid and the comonomer described above (also referred to as "poly(meth)acrylic acid copolymer").

They may be used in combination.

Aminocarboxylic Acid

Aminocarboxylic acid used for the quaternary ammonium salt of aminocarboxylic acid is the aminocarboxylic acid intramolecularly having one or more carboxyl group(s), which may be mono- or disubstituted N-aminocarboxylic acid.

As the aminocarboxylic acid, specifically, iminodiacetic acid, nitrilotriacetic acid, ethylenediaminetetraacetic acid (EDTA), diethylenetriaminepentaacetic acid (DTPA), triethylenetetraaminehexacetic acid, 1,3-propanediaminetetraacetic acid, glycoletherdiaminetetraacetic acid, dicarboxymethylglutamic acid, ethylenediaminedisuccinic acid, hydroxyethylethylenediaminetriacetic acid, 1,3-diamino-2-hydroxypropanetetraacetic acid and hydroxyethyliminodiacetic acid, and partially metal salt and/or basic nitrogen compound salt (such as ammonium salt) thereof and the like may be proposed.

As the glycoletherdiamine described above, polyalkylenediol, which is made of monomers such as ethylene glycol, propylene glycol, 1,3-propanediol or 1,4-butanediol through ether-linkage, substituted with amines at both ends may be proposed and, specifically, diethylene glycoldiamine, triethylene glycoldiamine, polyethylene glycoldiamine, dipropylene glycoldiamine, tripropylene glycoldiamine and polypropylene glycoldiamine and the like may be proposed.

Among them, in particular, aminoacetic acid intramolecularly having four or more carboxy groups, for example, ethylenediaminetetraacetic acid (EDTA) and diethylenetriaminepentaacetic acid (DTPA) are preferred.

Further, the quaternary ammonium salts of polycarboxylic acid and/or aminocarboxylic acid of the present invention may be a double salt like the quaternary ammonium salt represented by the following formula (2-2):

$$[R^1R^2R^3R^4N^+]_n Y^{j-} \cdot W^{k-} \quad (2\text{-}2)$$

(wherein, $R^1$, $R^2$, $R^3$ and $R^4$ each independently represents a hydrocarbon group having 1 to 20 carbon atoms, and the hydrocarbon group is a linear or branched alkyl group, cycloalkyl group, aryl group, aralkyl group or alkylaryl group; the hydrocarbon group may have a substituent, the substituent including hydroxy group, acyl group, acyloxy group, alkoxy group, alkoxycarbonyl group, carboxyl group, amino group, amide group, vinyl group, allyl group, hydroxyalkyloxy group or alkoxyalkyloxy group, or halogen atoms;

n represents an integer of 4 or more in the case of polycarboxylic acid, and 1 or more in the case of aminocarboxylic acid;

$Y^{j-}$ and $W^{k-}$ are counter-anions; j+k is n; j represents an integer from 1 to 10,000; $Y^{j-}$ is an anion derived from polycarboxylic and/or aminocarboxylic acid(s), $W^{k-}$ is at least one anion selected from the group consisting of hydroxide anion, anion derived from a fatty acid having 1 to 20 carbon atoms, and carbonate anion, bicarbonate anion and borate anion).

In the present invention, among quaternary ammonium salts represented by the above formulae (2-1) and (2-2), tetraalkyl-based or hydroxyalkyl-based (in particular, choline-based) quaternary ammonium salts are preferably used.

In the above-mentioned (III), the $Y^{n-}$ is a counter-anion, and as a compound generating a counter-anion, Y can be the following (i) to (v), and they may be used in combination.

(i) Carbonic acid monoester (carbonic acid monoester residue may be the same as above $R^1$) or metal bicarbonate: specifically carbonic acid monomethylester and carbonic acid monoethyl ester; sodium bicarbonate, potassium bicarbonate, calcium bicarbonate and magnesium bicarbonate.

(ii) Acidic enol-based compound: specifically acetyl acetone; diacetyl acetone; acetoacetic acid ester such as methylacetoacetate or ethylacetoacetate; dehydroacetic acid; α-acetyl-γ-butylolactone; 1,3-diketone compounds such as 1,3-cyclohexanedione, dimedone or Meldrum's acid; oxocarbon acids such as delta acid, squaric acid, croconic acid, rodizonic acid or heptagonic acid; and ene-diol compounds such as 2,3-dihydroxy-2-cyclopentene-1-one, (iso)ascorbic acid or kojic acid.

(iii) Phenol-based compound or alcohol-based compound: specifically phenol-based compounds including phenol and substituted phenol compounds of derivatives thereof, hindered phenol compounds, and aromatic monool compounds such as naphthol and derivatives thereof; aromatic diol compounds such as hydroquinone, resorcin, catechol, bisphenol-F, bisphenol-A or biphenol; aromatic polyol compounds such as benzene triol, novolak resin, phenol aralkyl resin or polyvinylphenol (co) polymer.

Specifically, alcohol-based compounds includes monool compounds such as methanol, ethanol, propanol, butanol, cyclohexanol, methyl cellosolve or ethyl cellosolve; diol compounds such as ethyleneglycol, propyleneglycol, butyleneglycol or 1,6-cyclohexanediol; and polyol compounds such as glycerin, pentaerythritol or cyclohexane dimethanol.

(iv) Acidic azole-based compound: specifically triazole compounds such as benzotriazole; imidazole compounds such as purin, theophylline, benzoimidazole, xanthine, hypoxanthine, guanine or polyvinyl imidazole; and tetrazole compounds such as 1H-tetrazole, 5,5'-bi-1H-tetrazole or 5-phenyl-1H-tetrazole.

(v) Non-carboxylic acid-based compound such as organic sulfur compound, organic phosphorus compound or organic boron compound: specifically organic sulfate compounds such as methylsulfate, ethylsulfate, laurylsulfate or phenylsulfate; organic sulfonate compounds such as methanesulfinate, (trifluoro)methanesulfonate, paratoluenesulfonate, bis(trifluoromethane)sulfonylimide, polyvinylsulfonate (co) polymer, polyallylsulfonate (co)polymer or sulfonated polystyrene (co)polymer; organic phosphate(phosphite) compounds such as mono/dimethyl phosphate, mono/diethyl phosphate, mono/di-2-ethylhexyl phosphate, mono/distearyl phosphate, mono/diphenyl phosphate, di-2-ethylhexylhydrogen phosphite, distearylhydrogen phosphite or diphenylhydrogen phosphite; organic phosphonate (phosphonite) compounds such as methyl phosphonate(phosphonite), ethyl phosphonate(phosphonite), phenyl phosphonate (phosphonite), polyvinyl phosphonic acid (co)polymer, mono-sodium methylphosphonate (phosphonite), 9,10-dihydro-9-oxa-10-phosphaphenanthroline-10-oxide, 1-hydroxyethylidene-1,1-diphosphate or nitrotris(methylphosphonate); organic phosphinate (phosphinite) compounds such as dimethyl phosphinate (phosphinite), diethyl phosphinate (phosphinite), methylphenyl phosphinate (phosphinite), diphenyl phosphinate (phosphinite) or 1-hydroxy-1-oxophosphoran; organic boronate compounds such as phenylboronate; borate tetraester compounds which are complexes of boric acid with either alcohol compound or carboxylic acid compound such as methanol, ethanol, ethyleneglycol, propyleneglycol, 1,2-butandiol, glycerin, pentaerythritol, mannitol, polyvinyl alcohol (co)polymer, catechol, salicylic acid or benzoic acid; or tetra-substituted borate compound such as tetraethyl borate or tetraphenyl borate.

The quaternary ammonium salt according to the present invention may be either double or complex salt such as a quaternary ammonium salt represented by the following formula (3-2):

$$[R^1R^2R^3R^4N^+]_nY^{j-}\cdot W^{k-} \quad (3\text{-}2)$$

(wherein, $R^1$, $R^2$, $R^3$ and $R^4$ each independently represents a hydrocarbon group having 1 to 20 carbon atoms, the hydrocarbon group is a linear or branched alkyl group, cycloalkyl group, aryl group, aralkyl group or alkylaryl group, the hydrocarbon group may have a substituent, the substituent including hydroxy group, acyl group, acyloxy group, alkoxy group, alkoxycarbonyl group, carboxyl group, amino group, amide group, vinyl group, allyl group, hydroxyalkyloxy group or alkoxyalkyloxy group or halogen atoms; n is an integer of 1 or more, and so as to be classified as the polymer, n represents an average value of 10000 or below, preferably 1000 or below, and more preferably 100 or below;

$Y^{j-}$ and $W^{k-}$ are counter-anions; j+k is n; j represents an integer of 1 or more, and so as to be classified into the polymer, represents an average value of 10000 or below, preferably 1000 or below, and more preferably 100 or below; $Y^{j-}$ is an anion originated from the compound represented by the above (i) through (v); $W^{k-}$ is at least an anion selected from the group consisting of hydroxide anion, anion derived from a fatty acid having 1 to 20 carbon atoms, carbonate, bicarbonate and borate anion.)

According to the present invention, the quaternary ammonium salts represented by the formulae (1-1) and (3-2) are generally called the "quaternary ammonium salt of the present invention".

Usually, the quaternary ammonium salt of an acidic cyclic amide compound described above may easily be prepared in the form of a uniform solution by, for example, neutralization between an acidic cyclic amide compound and a quaternary ammonium hydroxide in a solvent. The salt is not necessarily an equimolar salt, and the allowance of deviation is 10% or below, and preferably 5% or below from the equimolar salt.

As a solvent described above, water; alcohols such as methanol or ethanol, ethers/formals such as diethyl ether, tetrahydrofuran, dioxane or dioxolane; organic solvents such as halogenated hydrocarbons; aqueous mixed solvents with water and hydrophilic organic solvents such as methanol; and mixed solvents such as between organic solvents may be proposed.

As a quaternary ammonium salt of an acidic cyclic amide compound, for example, mono- to tris-[(2-hydroxyethyl)trimethylammonium] salts of (iso) cyanuric acid, mono- to tris-(tetramethylammonium) salts of (iso)cyanuric acid, (2-hydroxyethyl)trimethylammonium salts of 5,5-dimethylhydantoin, (2-hydroxyethyl)trimethylammonium salts of benzoimidazolone, tetramethylammonium salts of benzoimidazolone, tetramethylammonium salts of 5,5-dimethylhydantoin, (2-hydroxyethyl)trimethylammonium salts of phthalimide, tetramethylammonium salts of phthalimide may be proposed.

Usually, the quaternary ammonium salt described above can easily be prepared by a partial or complete neutralization between the above polycarboxylic and/or aminocarboxylic acid and a quaternary ammonium hydroxide in a solvent, for example, it can be prepared in a uniform solution by a partial or complete neutralization in a solvent. The salt is not necessarily an equimolar salt, and the molar ratio of quaternary ammonium residue to carboxylic acid residue (of polycarboxylic and/or aminocarboxylic acid(s)) may only be from 99/1 to 1/99, preferably from 90/10 to 10/90 and more preferably from 70/30 to 30/70.

The polycarboxylic and/or aminocarboxylic acid(s), which is the counter-anion of quaternary ammonium salt for use in the present invention, does not substantially cause an unfavorable action to decompose a main chain of polyacetal resin even in the case the amount of its carboxylic acid residue excessively presents as compared to the molar amount of quaternary ammonium salt residue, while inhibiting Cannizzaro and Formose reactions which are undesirable reaction progressing under an alkaline condition. Therefore, as indicated above, the broad range of its neutralized material (quaternary ammonium salt) on a molar basis can be used.

Contrary to it, in using formic acid as a counter-anion, in the case its residue presents excessively as compared to the quaternary ammonium salt residue on a molar basis, it results in the decomposition of the unstable terminal group of polyacetal resin together with causing an action decomposing the main chain of the polyacetal resin, thereby obtaining a stabilized polyacetal resin becomes impossible.

As the solvent described above, water; alcohols such as methanol or ethanol; ethers/formals such as diethyl ether, tetrahydrofuran, dioxane or dioxolane; organic solvents such as halogenated hydrocarbons; aqueous mixed solvents with water and hydrophilic organic solvents such as methanol; and mixed solvents such as between organic solvents may be proposed.

As the quaternary ammonium salt of polycarboxylic acid, the quaternary ammonium salt of 1,2,3,4-butanetetracarboxylic acid is preferred, and mono- to tetrakis [tetramethylammonium] salts, mono- to tetrakis[(2-hydroxyethyl)trimethylammonium] salts, mono- to tetrakis[(2-hydroxyethyl)triethylammonium] salts thereof and the like may be proposed.

As the quaternary ammonium salt of poly(meth) acrylic acid, and preferably, poly[tetramethylammonium] salts, poly [(2-hydroxyethyl)trimethylammonium] salts, poly[(2-hydroxyethyl)triethylammonium] salt and the like may be preferred.

As the quaternary ammonium salt of ethylenediaminetetraacetic acid, mono- to tetrakis[tetramethylammonium] salts, mono- to tetrakis[(2-hydroxyethyl)trimethylammonium] salts, mono- to tetrakis[(2-hydroxyethyl)triethylammonium] salts thereof and the like may be preferred.

Mono- to tetrakis[tetramethylammonium] salts of ethylenediaminetetraacetic acid and the like may be proposed. As the quaternary ammonium salt of diethylenetriaminepentaacetic acid, mono- to pentakis[tetramethylammonium] salts, mono- to pentakis[(2-hydroxyethyl)trimethylammonium] salts, mono- to pentakis [(2-hydroxyethyl)triethylammonium] salts thereof and the like may be proposed.

Usually, the above quaternary ammonium salt is readily prepared by known methods such as neutralization of a compound represented by (i) to (v) above with a quaternary ammonium hydroxide in a solvent; a reaction (corresponding to the preparation of carbonic acid monoester described in (i) above) of a tertiary amine compound with a carbonic acid diester (such as carbonic acid dimethyl ester, carbonic acid diethyl ester, or carbonic acid di(2-hydroxyethyl)ester); an addition reaction of a tertiary amine with an alkylene oxide in an alcohol compound; or a reaction (corresponding to the preparation of alcohol-based compound described in (iii) above) of a metal alkoxide with a halogenated quaternary ammonium salt.

For example, the neutralization in a solvent provides a homogeneous solution. The salt is not necessarily an equimolar salt, and the mole ratio of the quaternary ammonium residue to the counter-anion residue may be in a range from 99/1 to 1/99, preferably from 90/10 to 10/90, and more preferably from 70/30 to 30/70. In particular, among the quaternary ammonium salts according to the present invention, when the counter-anion compound is (i), (ii), (iii) or (iv) or an organic boron compound of (v), the decomposition of the main chain of the polyacetal resin will not be accelerated even in the case the counter-anion compound is excessively present as compared to the molar amount of the quaternary ammonium residue. No limitation is therefore made to use of a neutralized material. It is possible to control Cannizzaro reaction or Formose reaction which progress in the presence of alkali. On the other hand, when formic acid which is a strong acid is adopted as the counter-anion compound, excess molar ratio of the formic acid to the amount of quaternary ammonium residue makes the decomposition of main chain of the polyacetal resin proceed together with the decomposition of the unstable terminal group, failing to achieve stabilization.

Examples of the above reaction solvent are water; alcohols such as methanol, ethanol, ethyleneglycol, propyleneglycol, 1,4-butanediol, methylcellosolve or ethylcellosolve; carbonic acid esters such as dimethyl carbonate or diethyl carbonate; ethers/formals such as diethyl ether, tetrahydrofuran, dioxane or dioxoran; organic solvents such as halogenated hydrocarbon; water-based mixed solvents such as water and hydrophilic organic solvents such as methanol or ethanol; and mixed solvents between organic solvents.

Examples of the quaternary ammonium salt are as follows: mono [tetramethylammonium] salt, mono [(2-hydroxyethy) trimethyl] ammonium salt and mono [(2-hydroxyethyl)triethyl] ammonium salt of organic compounds such as carbonic acid monomethyl ester, carbonic acid monoethyl ester, calcium bicarbonate, magnesium bicarbonate, acetylacetone, methyl acetoacetate, ethyl acetoacetate, dehydro acetate, phenol, naphthol, p-t-butylphenol, 2,6-di-t-butylphenol, 2,6-di-t-butyl-p-cresol, 2-phenylphenol, methanol, ethanol, theophylline, methane sulfonate, 9,10-dihydrodi-9-oxa-10-phosphaphenanthroline-10-oxide, dimethylphosphinate, methanol complex of trimethylborate or ethanol complex of triethylphosphate; mono- to bis[tetramethylammonium] salt, mono- to bis[(2-hydroxyethyl)trimethyl] ammonium salt and mono- to bis[(2-hydroxethyl)triethyl] ammonium salt of organic compounds such as catechol, resorcinol, hydroquinone, biphenyl, bisphenol-F, bisphenol-A, 2,2'-methylene bis(4-methyl-6-t-butylphenol), ethyleneglycol, squaric acid, (iso)ascorbic acid, 5,5'-bi-1H-tetrazol or phenyl phosphonate (phosphonite)); mono- to tetrakis[tetramthylammonium] salt, mono- to tetrakis [(2-hydroxyethyl) trimethyl] ammonium salt and mono- to tetrakis[(2-hydroxyethyl)triethyl]ammonium salt of organic compounds such as 1-hydroxyethylidene-1,1-diphosphonic acid; mono- to hexakis [tetramethylammonium] salt, mono- to hexakis[(2-hydroxyethyl)trimethyl]ammonium salt and mono- to hexakis[(2-hydroxyethyl)triethyl]ammonium salt of organic compounds such as nitrirotris(methylphosphonic acid); mono- to poly[tetramethylammonium] salt, mono- to poly [(2-hydroxyethyl)trimethyl]ammonium salt and mono- to poly[(2-hydroxyethyl)triethyl]ammonium salt of acidic organic polymer such as novolak resin, phenolaralkyl resin, poly-p-vinylphenol (co) polymer, sulfonated polystyrene (co)polymer, polyvinylsulfonate (co)polymer, or poly 2- or 4-vinylimidazole (co)polymer.

Other preferable quaternary ammonium salts are given in the following patents, which are classified into (i) to (v) according to the present invention: JP-A 48-84895, JP-A 49-4785, JP-A 49-4787, JP-A 50-25510, JP-A 52-17484, JP-A 57-117520, JP-A 61-42522, JP-A 62-219508, JP-A 63-132863, JP-A 9-202752, JP-A 9-301935, JP-A 11-171981, JP-A 11-265072, JP-A 2001-106656, U.S. Pat. No. 2,635,100, U.S. Pat. No. 2,776,287, U.S. Pat. No. 4,116,879, U.S. Pat. No. 543,803, U.S. Pat. No. 6,030,491, GB-B 800171, GB-B 817688 and GB-B 823242.

Method for Treating Unstable Terminal Group

The method of stabilizing the polyacetal resin according to the present invention is to apply heat treatment to the polyacetal resin which has been polymerized by the above described method in the presence of at least one of the above decomposers, thus decreasing the amount of unstable terminal group.

The amount of decomposer to add to 1 kg of polyacetal resin depends on the kind and amount of the unstable terminal group included, the kind of decomposer, the treating state, the treating condition (temperature, time, contacting rate and the like). If the treatment was conducted under the molten state of the polyacetal resin, the amount, as calculated on the basis of the nitrogen atom which provides quaternary ammonium, is in a range from 0.005 to 3.5 mmol, preferably from 0.01 to 3 mmol, and particularly preferably from 0.1 to 2.5 mmol.

The above decomposer may be used in combination with other known decomposer as needed.

The heat treatment may be given after inactivating the polymerization catalyst left in the polymerized polyacetal resin, or before the inactivation thereof. The heat treatment is also applicable to a polyacetal resin which contains a large amount of remaining unstable terminal groups after conducting a stabilization treatment besides the present one.

Inactivation of the polymerization catalyst is conducted by after the polymerization, charging the polyacetal resin into an aqueous solution or organic solvent, which contains at least one catalyst-inactivator including amines such as ammonia or alkyl amine, hydroxides of alkali or alkaline earth metals, inorganic acid salts and organic acid salts, and then allowing the mixture to stand or agitating in slurry state for, generally, one minute to 6 hours. The slurry after the catalyst inactivation is filtered and rinsed to remove unreacted monomer, catalyst inactivator and the like, and is used as it is or after dry.

Other applicable methods to inactivate the polymerization catalyst is the one contacting the vapor of such amines above with the polyacetal resin, and the one mixing the polyacetal resin with at least one selected from the group consisting of hindered amine, aminotriazine, triphenylphosphine, calcium hydroxide and magnesium hydroxide and then stirring.

When the polymerization catalyst is not inactivated, the polyacetal resin may be heated in an inert gas atmosphere at a temperature not higher than the melting point of the resin polymerized to distill and decrease the polymerization catalyst and used. The inactivation of polymerization catalyst and also the distillation and decrease of that may be given after pulverizing the polymerized polyacetal resin.

The present invention can adopt various conventional manufacturing methods and apparatuses therefor.

Regarding the method for decomposing the unstable terminal group, pyrolytic treatment using a decomposer is given in a molten state of the polyacetal resin or in a state of the solvent of the polyacetal resin being slurry, on finishing the necessary treatment such as the neutralization of the catalyst after polymerization.

For the treatment method of polyacetal resin in a molten state, for example, a single or twin-shaft extruder is used to melt the resin, and treatment is given at temperatures ranging from the melting point of the polyacetal resin to 260° C., preferably from the melting point thereof to 250° C., for the resin residence time of 5 seconds to 30 minutes, preferably 20 seconds to 20 minutes. If treatment is given below the minimum of the treatment condition described above, the stabilization of resin would be insufficient, and if above the maximum of that, decomposition or coloring of the resin might occur. Addition of the decomposer may be given either in the step before or after melting the polyacetal resin, and further it may be given both steps before and after the melting. The amount of the decomposer to add may be divided and applied in multistep.

For adding the decomposer to the polyacetal resin before melting, the aqueous solution of the decomposer or the solution of the decomposer in an organic solvent or alcohol such as methanol or ethanol is added by a defined amount to the crude polyacetal resin, as uniformly as possible, before mixing. For mixing, a common mixer such as horizontal cylinder, V-shaped, ribbon, paddle, or high speed fluid mixer can be used. The mixture may be subjected to melting treatment without drying, or after distilling the solvent off by heating or vacuum. The decomposer solution may be supplied by injection through the feeder inlet and/or midway of the extruder. At that time, the decomposer solution may be supplied in multistage.

The decomposer may be added by the way first mixing the above solution with the resin to prepare slurry, then filtered and dried to adhere the decomposer to the resin.

The method to add the decomposer to the polyacetal resin in a molten state after melting the polyacetal resin may be done by feeding and/or injecting the decomposer and the solvent separately, or as a solution of the decomposer in the solvent.

On conducting the decomposition in a molten state, one or more kind(s) of materials selected from antioxidant (such as hindered phenol or hindered amine); decomposition enhancer (such as water; methanol; amines such as triethylamine, tributylamine, mono- to triethanolamine or diethylethanolamine; alkaline earth metal compounds such as magnesium hydroxide, calcium hydroxide or magnesium oxide; or quaternary ammonium compounds); and hue stabilizer (such as orthoboric acid, methaboric acid, tetraboric acid, boron oxide or metal borate) may be added as needed by the respective amounts between 0.001 and 5 parts by weight and preferably 0.005 and 2 parts by weight to 100 parts by weight of the resin.

After the unstable terminal parts being decomposed and removed, formaldehyde generated during the decomposition, unreacted monomers, oligomers, the decomposer and the like are removed under reduced pressure from the polyacetal resin through the vent opening of the extruder, and then the polyacetal resin is cooled and formed into pellets by strand cutting or die-face cutting.

When the treatment of the polyacetal resin is conducted in a slurry state, the solution of decomposer in water, alcohol, or water and alcohol is added to the polyacetal resin in an amount of 0.005 to 35 mmol of the decomposer to the resin, calculated on the basis of a nitrogen atom providing the quaternary ammonium above, preferably from 0.01 to 30 mmol, and more preferably from 0.1 to 25 mmol, and then heat treatment is applied under an atmospheric pressure or positive pressure.

The slurry concentration is from 3 to 70% by weight, preferably from 5 to 60% by weight, the heating temperature is above 60° C. and below the melting point of the resin, preferably from 80° C. to 140° C., and the heating time is from 10 minutes to 30 hours, preferably from 20 minutes to 20 hours.

After the treatment, the polyacetal resin is filtered and rinsed to remove formaldehyde generated during the decomposition, unreacted monomers, oligomers, decomposer and the like, dried in the same manner as the treatment in a molten state, and formed to the products of the stabilized polyacetal resin.

Further, the present invention is to provide a stabilized polyacetal resin, wherein the number-average molecular weight is 5000 or more, and the amount of terminal group of hemiacetal is 0.6 mmol/kg or less, and/or the amount of terminal group of formyl is 0.5 mmol/kg or less.

As mentioned above, that kind of polyacetal resin containing a small amount of unstable terminal group cannot be found in related art, and they may be used in novel applications where the drastic reduction of the generation of formaldehyde and the decrease of odor may be required.

It is also to provide a stabilized polyacetal resin, wherein the number-average molecular weight is 5000 or more, and the amount of terminal group of hemiacetal is 0.6 mmol/kg or less, and/or the amount of terminal group of formyl is 0.6 mmol/kg or less.

In the present invention, the above decomposer is provided as the unstable terminal group decomposer for the polyacetal resin having unstable terminal groups. The form of the decomposer is not limited in particular, and any of powder, granule and liquid can be used.

The obtained stabilized polyacetal resin may be mixed in an extruder or the like with the following-given additives as needed to prepare a polyacetal resin composition, and then may be used for molding:
(a) between 0.001 and 5 parts by weight of at least one selected from the group consisting of antioxidant, formaldehyde scavenger, formic acid scavenger, hue stabilizer (such as boron compound or phosphorus compound), fluorescent brightening agent, weather resistant stabilizer, light resistant stabilizer, mold release agent and crystal nucleator;
(b) between 0 and 100 parts by weight of at least one selected from the group consisting of filler, reinforcing agent, thermoplastic resin, thermoplastic elastomer, core-shell polymer, lubricant, sliding agent and electric conduction agent; and
(c) between 0 and 5 parts by weight of colorant.

Generally, the additives such as scavenger, antioxidant or stabilizer are preferably added to the polyacetal resin after terminal stabilization, then the mixture is melted and kneaded to prepare the polyacetal resin composition. The additives can be added to the raw material monomer or comonomer before the polymerization, and also in the polymerization or stabilization stage as well, if only the addition does not adversely affect the efficiency of polymerization, catalyst inactivation, stabilization and the like.

To explain in detail, as an antioxidant described above, the polyacetal resin composition of the present invention preferably comprises at least one antioxidant selected from the group consisting of hindered phenol-based antioxidant, hindered amine-based antioxidant, phosphorus-based antioxidant and sulfur-based secondary antioxidant, in an amount between 0.01 and 1 part by weight to 100 parts by weight of the stabilized polyacetal resin.

The formaldehyde scavenger preferably comprises at least one selected from the group consisting of aminotriazine compound, urea compound, carboxylic acid hydrazide compound, polyurethane resin, poly(math)acrylamide resin and polyamide resin in an amount between 0.01 and 2 parts by weight to 100 parts by weight of the stabilized polyacetal resin.

As the aminotriazine compound described above, melamine, benzoguanamine, CTU-guanamine, melamine resin and the like may be proposed.

As the urea compound described above, urea formaldehyde, biurea, hydantoin, 5,5-dimethylhydantoin, allantoin, aluminum salts of allantoin and the like may be proposed.

As the carboxylic acid hydrazide compound described above, stearic hydrazide, adipic hydrazide; sebacic dihydrazide, dodecanedioic dihydrazide, isophthalic dihydrazide, terephthalic dihydrazide, 2,6-naphthalenedicarboxylic acid dihydrazide and the like may be proposed.

As the polyamide resin described above, nylon 3, nylon 6, nylon 66, nylon 6-66-610 and the like may be proposed.

As the formic acid scavenger (thermostabilizer), the polyacetal resin composition according to the present invention preferably contains 0.001 to 0.2 part by weight to 100 parts by weight of the stabilized polyacetal resin of at least one compound selected from the group consisting of fatty acid metal salt which may have hydroxy group, metal poly(meth)acrylate (co)polymer, metal aminocarboxylate, metal (iso)cyanulate, metal silicate (such as talc and zeolite), hydrotalcite, magnesium hydroxide and magnesium oxide.

As fatty acid metal salts, calcium acetate, calcium propionate, calcium citrate, calcium stearate, calcium 12-hydroxystearate, magnesium stearate and the like may be proposed.

The polyacetal resin composition according to the present invention preferably comprises as mold release agent at least one selected from the group consisting of fatty acid ester and fatty acid amide having 12 to 36 carbon atoms between 0.01 and 1.0 part by weight to 100 parts by weight of the stabilized polyacetal resin.

As the above fatty acid ester, ethyleneglycol distearate and glycerin mono- to tristearate, and as the fatty acid amide, ethylene bis-stearyl amide and the like may be proposed.

The stabilized polyacetal resin or polyacetal resin composition of the present invention can be formed into a molded article by, for example, injection molding, extrusion molding, blow molding, press molding, gas injection molding or foam molding.

The molded article of the present invention shows following properties, (1) when keeping the molded article in a sealed space at 80° C. for 24 hours, the amount of formaldehyde generated is 2 μg or less, preferably 1.5 μg or less and more preferably 0.001 to 1.0 μg per 1 $cm^2$ of surface area of the molded article, and/or (2) when keeping the molded article in a sealed space at 60° C. for three-hours under saturated humidity, the amount of formaldehyde generated is 0.8 μg or less, preferably 0.6 μg or less and more preferably 0.001 to 0.6 μg per 1 $cm^2$ of surface area of the molded article.

The molded article of the present invention is used in automobile parts, electric and electronic components, building materials and piping parts, livingware parts, cosmetic parts and medical article parts.

EXAMPLES

The present invention is described below referring to Examples thereof. It, however, is not limited to them in interpretation.

The invention is hereinafter described separately in view of using a quaternary ammonium salt of (I), a quaternary ammonium salt of (II) and a quaternary ammonium salt of (III), referring to Manufacture Examples and Comparative Manufacture Examples of a stabilized polyacetal resin, Examples and Comparative Examples of compositions using a stabilized polyacetal resin and molded articles thereof.

Examples Using a Quaternary Ammonium Salt of (I)

(1) Manufacture Examples and Comparative Manufacture Examples of Stabilized Polyacetal Resin (Copolymer)

Preparation of Crude Polyacetal Copolymer (A) for Stabilization Treatment

Using a continuous mixing reactor having a cross section in the shape of two circles partially overlapped each other and comprising a barrel equipped with a jacket through which a heat (cooling) medium passes through and twin rotary shafts, which were placed longitudinally in this barrel and equipped with stirring and propulsion paddles respectively, the following polymerization reaction was conducted.

While passing a water at 80° C. through the jacket, rotating twin rotary shafts at a speed of 100 rpm and feeding the reactor with 0.05% by weight of triethyleneglycol [3-(3-t-butyl-5-methyl-4-hydroxyphenyl)propionate] as an antioxidant, 3.3% by weight of 1,3-dioxolane as comonomer and 700 ppm (by weight) methylal in trioxane as a chain transfer agent continuously; a solution (1 wt % concentration) of trifluorinated boron/dibutyl etherate dissolved in cyclohexane at a concentration of 10 ppm (by weight) to the total amount of monomer (sum of trioxane and 1,3-dioxolane) was continuously added as a trifluorinated boron to copolymerize. Then, the crude polyacetal copolymer, which was drained and obtained from the outlet of the reactor, was added to the aqueous solution of 0.1% by weight of triethylamine to inactivate catalyst. The mixture was centrifuged and dried to obtain a crude polyacetal copolymer (A).

As for the crude polyacetal copolymer (A), the amount of terminal group of hemiacetal thereof was 2.5 mmol/kg, the amount of terminal group of formyl thereof was 1.7 mmol/kg, and the amount of unstable terminal (the amount of unstable terminal portion) was 0.63% by weight.

Manufacture Examples 1-1 to 1-7

To 100 parts by weight of the crude polyacetal copolymer (A) described above, 0.3 part by weight of triethyleneglycol [3-(3-t-butyl-5-methyl-4-hydroxyphenyl)propionate] and as a decomposer, 2 parts by weight of the aqueous solution of the quaternary ammonium salt of an acidic cyclic amide compound described below (the addition rate of quaternary ammonium salt was at 1.4 mmol per kg of the crude polyacetal copolymer calculated on the basis of a quaternary ammonium nitrogen), which had been adjusted to a defined concentration, were added and uniformly mixed.

Then, the mixture was fed to a twin-shaft extruder (30 mm in diameter) provided with a single vent opening, and melted and kneaded, setting the extruder at the vent vacuum level of 2.7 kPa (20 mmHg) and the cylinder temperature of 200° C. for the average residence time of 300 seconds, while removing volatile matters out of a vent opening, thereby obtaining a stabilized polyacetal copolymer in a pellet form (Manufacture Examples 1-1 (a-1) to Manufacture Examples 1-7 (a-7).
(Decomposer)

The quaternary ammonium salt of acidic cyclic amide compound used in Manufacture Examples 1-1 to 1-7 are (A-1) to
(A-7) described below, respectively.
(A-1): tris[(2-hydroxyethyl)trimethylammonium] salt of isocyanuric acid
(A-2): bis[(2-hydroxyethyl)trimethylammonium] salt of isocyanuric acid
(A-3): mono[(2-hydroxyethyl)trimethylammonium] salt of isocyanuric acid
(A-4): (2-hydroxyethyl)trimethylammonium salt of phthalimide
(A-5): (2-hydroxyethyl)trimethylammonium salt of 5,5-dimethylhydantoin
(A-6): tris[(2-hydroxyethyl)triethylammonium] salt of isocyanuric acid
(A-7): tris(tetramethylammonium) salt of isocyanuric acid Manufacture Example 1-8

To 100 parts by weight of the crude polyacetal copolymer (A) described above, 0.3 part by weight of triethyleneglycol [3-(3-t-butyl-5-methyl-4-hydroxyphenyl)propionate] and as a decomposer, 2 parts by weight of the aqueous solution of the quaternary ammonium salt of an acidic cyclic amide compound (A-1) described above (the addition rate of the quaternary ammonium salt was at 0.7 mmol per kg of the crude polyacetal copolymer calculated on the basis of a quaternary ammonium nitrogen), which had been adjusted to a defined concentration, were added and uniformly mixed.

Then, in the same manner in Manufacture Example described above, the mixture was melted and kneaded in a twin-shaft extruder to obtain a stabilized polyacetal copolymer (a-8) in a pellet form.

Manufacture Example 1-9

To 100 parts by weight of the crude polyacetal copolymer (A) described above, as a decomposer, 1 part by weight of the aqueous solution of the quaternary ammonium salt of an acidic cyclic amide compound (a-1) described above (the addition rate of quaternary ammonium salt was at 1.4 mmol per kg of the crude polyacetal copolymer calculated on the basis of a quaternary ammonium nitrogen), which had been adjusted to a defined concentration, was added, uniformly mixed and dried. Then, to 100 parts by weight of the crude polyacetal copolymer mixed with the quaternary ammonium salt, 0.3 part by weight of triethyleneglycol [3-(3-t-butyl-5-methyl-4-hydroxyphenyl)propionate] was added, supplied into the twin-shaft extruder described above. Further, to 100 parts by weight of the crude polyacetal copolymer being fed in the extruder, 0.5 part by weight of water was injected through the feeder inlet of extruder. The mixture was melted and kneaded, setting the extruder at the vent vacuum level of 2.7 kPa and the cylinder temperature of 200° C. for the average residence time of 300 seconds, while removing volatile matters out of a vent opening, thereby obtaining a stabilized polyacetal copolymer (a-9) in a pellet form.

Manufacture Example 1-10

To 100 parts by weight of the crude polyacetal copolymer (A) described above, as a decomposer, 1 part by weight of the methanol solution of the quaternary ammonium salt of an acidic cyclic amide compound (a-1) described above (the addition rate of quaternary ammonium salt was at 1.4 mmol per kg of the crude polyacetal copolymer calculated on the basis of a quaternary ammonium nitrogen), which had been adjusted to a defined concentration, was added, uniformly mixed and dried.

Then, to 100 parts by weight of the crude polyacetal copolymer mixed with the quaternary ammonium salt, 0.3 part by weight of triethyleneglycol [3-(3-t-butyl-5-methyl-4-hydroxyphenyl)propionate] was added, supplied into the twin-shaft extruder described above. Further, to 100 parts by weight of the crude polyacetal copolymer being fed in the extruder, 0.5 part by weight of water was injected. The mixture was melted and kneaded, setting the extruder at the vent vacuum level of 2.7 kPa and the cylinder temperature of 200° C. for the average residence time of 300 seconds, while removing volatile matters out of a vent opening, thereby obtaining a stabilized polyacetal copolymer (a-10) in a pellet form.

Manufacture Example 1-11

To 100 parts by weight of the crude polyacetal copolymer (A) described above, as a decomposer, 1 part by weight of the aqueous solution of the quaternary ammonium salt of an acidic cyclic amide compound (A-1) described above (the addition rate of quaternary ammonium salt was at 1.4 mmol per kg of the crude polyacetal copolymer calculated on the basis of a quaternary ammonium nitrogen), which had been adjusted to a defined concentration, was added, uniformly mixed and dried.

Then, to 100 parts by weight of the crude polyacetal copolymer mixed with the quaternary ammonium salt, 0.3 part by weight of triethyleneglycol [3-(3-t-butyl-5-methyl-4-hydroxyphenyl)propionate], 0.05 part by weight of nylon-6,6 (average particle size: 4 μm), 0.1 part by weight of calcium stearate and 0.2 part by weight of ethylene bis-stearyl amide were mixed, then supplied into the twin-shaft extruder described above. Further, to 100 parts by weight of the crude polyacetal copolymer being fed in the extruder, 0.5 part by weight of water was injected. The mixture was melted and kneaded, setting the extruder at the vent vacuum level of 2.7 kPa and the cylinder temperature of 200° C. for the average residence time of 300 seconds, while removing volatile matters out of a vent opening, thereby obtaining a stabilized polyacetal copolymer (a-11) in a pellet form.

Comparative Manufacture Example 1-1

To 100 parts by weight of the crude polyacetal copolymer (A) described above, 0.3 part by weight of triethyleneglycol [3-(3-t-butyl-5-methyl-4-hydroxyphenyl)propionate] and as a decomposer, 2 parts by weight of the aqueous solution of triethylamine (expressed as TEA) (triethylamine was at 1.4 mmol per kg of the crude polyacetal copolymer (A) calculated on the basis of a tertiary amine nitrogen), which had been adjusted to a defined concentration, were added and uniformly mixed. Then, the mixture was supplied into the twin-shaft extruder described above. The mixture was melted and kneaded, setting the extruder at the vent vacuum level of 2.7 kPa (20 mmHg) and the cylinder temperature of 200° C. for the average residence time of 300 seconds, while removing volatile matters out of a vent opening, thereby obtaining a stabilized polyacetal copolymer (a-T) in a pellet form.

Comparative Manufacture Example 1-2

To 100 parts by weight of the crude polyacetal copolymer (A) described above, 0.3 part by weight of triethyleneglycol [3-(3-t-butyl-5-methyl-4-hydroxyphenyl)propionate] and as a decomposer, 2 parts by weight of the aqueous solution of (2-hydroxyethyl)trimethylammonium salt (expressed as A-I) of formic acid being the quaternary ammonium salt of aliphatic carboxylic acid (the addition rate of quaternary ammonium salt was at 1.4 mmol per kg of the crude polyacetal copolymer calculated on the basis of a quaternary ammonium nitrogen) were added and uniformly mixed.

Then, the mixture was supplied into the twin-shaft extruder described above. The mixture was melted and kneaded, setting the extruder at the vent vacuum level of 2.7 kPa (20 mmHg) and the cylinder temperature of 200° C. for the average residence time of 300 seconds, while removing volatile matters out of a vent opening, thereby obtaining a stabilized polyacetal copolymer (a-I) in a pellet form.

On the stabilized polyacetal resins (copolymer) obtained in Manufacture Examples and Comparative Manufacture Examples described above, the amount of terminal group of hemiacetal, the amount of terminal group of formyl, the amount of the unstable terminal (the amount of unstable terminal portion), polycarbonate deterioration property and odor property were evaluated as its quality indicator. The results are summarized into Table 1.

The methods for determining each property for use as quality indices are as follows.
(Methods for Determining Evaluation Properties of the Stabilized Polyacetal Resin)
1. Amount of Terminal Group of Hemiacetal and Amounts of Terminal Group of Formyl A polyoxymethylene copolymer was dissolved in hexafluoroisopropyl alcohol, and to it, N, O-bis(trimethylsilyl)trifluoroacetamide and pyridine were added for reaction. Then, the mixture was air-dried and then vacuum-dried at 40° C. to remove the residual solvent and the material unreacted. The resulting reactant was dissolved in a solvent of deuterated hexafluoroisopropyl alcohol into a concentration of 5% by weight, then the solution was filled into NMR sample tubes and measured NMR spectra at room temperature.

The amounts of terminal group of hemiacetal (mmol/kg) and formyl (mmol/kg) were calculated based on the corresponding NMR absorption peaks respectively.

NMR apparatus: AVANCE™ 400, FT-NMR, from Bruker
measuring condition: pulse flip angle of 30°, average repetition time of 10 sec and averaging of 128 times.
2. Amount of Unstable Terminal (the Amount of Unstable Portion of the Terminal)

Approximately 1 g of the polyacetal copolymer was measured, and put in a hermetic pressure container with 15 mg of calcium hydroxide and 100 ml of aqueous solution containing 0.5% by volume ammonium hydroxide in 60% by volume methanol, subjected to heat treatment for 60 mins at 170° C., then cooled and opened the container to take out the inner solution. The amount of formaldehyde, which had been generated by the decomposition of the unstable terminal and dissolved into the solution, was measured by acetylacetone absorptiometry in accordance with JIS item No. K0102, 29.1, and calculated the % by weight ratio against the polyacetal copolymer.
3. Polycarbonate Deterioration Properties (Abbreviated as PC Deterioration in Table)

1.5 g of pellet-formed polyacetal copolymer, 1 ml of distilled water and a piece of polycarbonate resin plate (5 mm×5 mm×1 mm) were put in a 20 ml-container and sealed, heated in a thermostat bath at 120° C. for 24 hours, then taken out therefrom and cooled to room temperature. Deterioration of the surface of the polycarbonate resin plate was visually inspected and evaluated based on the criteria described below.

○: surface retains the original gloss before the test.
Δ: surface is cloudy.
x: surface is discolored and melted.
4. Odor Property 1 g of pellet-formed stabilized polyacetal copolymer was put in a 20 ml-container and sealed, heated in the thermostat bath at temperature 80° C. for 24 hours, then simultaneously opening the container, irritating odor (coming from formaldehyde and acid) therefrom was olfactorily evaluated based on the criteria described below.

○: almost no irritating odor
Δ: slightly irritating odor
x: strong irritating odor (2) Examples and Comparative Examples of Stabilized Polyacetal Resin Composition and Molded Article Thereof Examples 1-1 to 1-8

To the stabilized polyacetal copolymer (a-1) prepared in Manufacture Example 1-1 and the stabilized polyacetal copolymer (a-4) prepared in Manufacture Example 1-4 described above, the formaldehyde suppressor, antioxidant, processing stabilizer and thermostabilizer described below were mixed at the ratio shown in Table 2, and melt-mixed with a twin-shaft extruder having a diameter of 30 mm and a vent opening at one place, thereby preparing a stabilized polyacetal resin (copolymer) composition in a pellet form.

Comparative Example 1-1

Using the stabilized polyacetal copolymer prepared in Comparative Manufacture Example 1-1 (a-T) described above, a stabilized polyacetal resin (copolymer) composition was prepared in the same manner as the above Example except that the formaldehyde suppressor, antioxidant, processing stabilizer and thermostabilizer described below were mixed thereto at the ratio shown in Table 2.

The stabilization polyacetal copolymer, formaldehyde suppressor, hindered phenol-based compound, processing stabilizer, thermostabilizer used in Examples and Comparative Examples were the following.
(Stabilized Polyacetal Copolymer a)
(a-1): Stabilized polyacetal copolymer prepared in Manufacture Example 1-1
(a-4): Stabilized polyacetal copolymer prepared in Manufacture Example 1-4
(a-T): Stabilized polyacetal copolymer prepared in Comparative Manufacture Example 1-1
The properties of each copolymer are as shown in Table 1. Further, in accordance with ASTM-D1238, melt indices measured under a condition at a temperature of 190° C. and a load of 2160 g, are all 9.0 g/10 minutes.
(Formaldehyde Suppressor b)
(b-1): Melamine
(b-2): Benzoguanamine
(b-3): CTU-guanamine (from Ajinomoto Fine-Techno. Co. Inc.)
(b-4): Allantoin
(b-5): Biurea
(b-6): Sebacic acid dihydrazide
(b-7): Nylon 66 (average particle size=3 μm)
(Antioxidant c)
(c-1): Pentaerythritoltetrakis-[3-(3,5-di-t-butyl-4-hydroxyphenyl)propionate]
(c-2): Triethyleneglycol-bis-[3-(3-t-butyl-5-methyl-4-hydroxyphenyl)propionate]
(Processing Stabilizer d)
(d-1): Ethylene bis-stearyl amide
(d-2): Glycerin monostearate
(d-3): Ethyleneglycol distearate
(Thermostabilizer (Organic Metal Carboxylate, Alkaline Earth Metal Salt) e)
(e-1): Calcium 12-hydroxystearate
(e-2): Magnesium oxide
(e-3): Calcium citrate
(e-4): Calcium stearate The stabilized polyacetal resin (copolymer) composition in a pellet form obtained in Examples and Comparative Examples described above was formed into defined test pieces by injection molding, and evaluated by measuring the amounts of formaldehyde generated from the test pieces according to the method described below. The results are summarized into Table 2.
(Method for Determining Evaluation Properties of the Stabilized Polyacetal Resin)
1. Amount of Formaldehyde Generated in Wet State
Into a polyethylene bottle having a volume of 1 L, 50 ml of distilled water was poured and sealed with its lid, while 2 test plates (100 mm×40 mm×2 mm; total surface area of 85.6 cm$^2$) were suspended inside the bottle from its lid. The bottle was placed in a thermostat bath at 60° C. for a 3 hour-long heat treatment, then taken out therefrom and left at 20° C. for an hour.

The amount of formaldehyde released from the test pieces by heat treatment and dissolved into water was measured, and then the amount of formaldehyde generated per unit surface area (unit: μg/cm$^2$) was calculated.
2. Amount of Formaldehyde Generated in Dry State
10 test pieces (2 mm×2 mm×50 mm) (total surface area of approximately 40 cm$^2$) were placed in a container having a volume of 20 ml and sealed. The container was placed in the thermostat bath for heat treatment at 80° C. for 24 hours, then taken out therefrom and left at 20° C. for an hour. Subsequently, 5 ml of distilled water was injected into the container with a syringe to let water absorb the formaldehyde released from the test pieces through heating. The amount of formaldehyde dissolved in water was measured, and then the amount of formaldehyde generated per unit surface area (unit: μg/cm$^2$) was calculated.

Examples Using the Quaternary Ammonium Salt of (II)

In each Examples, (Method for determining evaluation properties of the stabilized polyacetal resin) and (Method for determining evaluation properties of the stabilized polyacetal resin composition) used as quality indices are as described above.

Further, the formaldehyde scavenger (b), hindered phenol-based antioxidant (c), processing stabilizer (d) and thermostabilizer (formic acid scavenger) (e) used in Examples and Comparative Examples are also as defined above.

Further, measurement method, measurement conditions and notations of the melt indices are also as defined above.
(Preparation of crude polyacetal copolymer (A) for stabilization treatment)
According to the same manufacture methods and manufacture conditions as those described above, a crude polyacetal copolymer (A) was obtained.

The amount of terminal group of hemiacetal of the crude polyacetal copolymer (A) was 2.2 mmol/kg, the amount of terminal group of formyl was 1.5 mmol/kg, and the amount of unstable terminal (the amount of unstable terminal portion) was 0.87% by weight.

Further, Comparative Manufacture Examples 2-1 and 2-2, and Comparative Example 2-1 described in the following are shared in each Example described in (I) and (II) below.

(I-1) Manufacture Examples and Comparative Manufacture Examples of the Stabilized Polyacetal Copolymer Using Quaternary Ammonium Salt Of Polycarboxylic Acid Manufacture Examples 2-I-1 to 2-I-5

To 100 parts by weight of the crude polyacetal copolymer (A) described above, 0.3 part by weight of triethyleneglycol [3-(3-t-butyl-5-methyl-4-hydroxyphenyl)propionate] and 2 parts by weight of an aqueous solution containing the quaternary ammonium salt of polycarboxylic acid described below (the quaternary ammonium salt was added at 1.4 mmol per kg of the crude polyacetal copolymer calculated on the basis of a quaternary ammonium nitrogen), which had been adjusted to a defined concentration, were added and uniformly mixed.

Then, the mixture was supplied into a twin-shaft extruder having a vent opening (30 mm in diameter). The mixture was melted and kneaded, setting the extruder at the vent vacuum level of 2.7 kPa (20 mmHg) and the cylinder temperature of 200° C. for the average residence time of 300 seconds, while removing volatile matters out of a vent opening, thereby obtaining a stabilized polyacetal copolymer in a pellet form.

Manufacture Example 2-I-6

To 100 parts by weight of the crude polyacetal copolymer (A) described above, 0.3 part by weight of triethyleneglycol [3-(3-t-butyl-5-methyl-4-hydroxyphenyl)propionate] and 2 parts by weight of an aqueous solution containing the quaternary ammonium salt of polycarboxylic acid shown in Table 3 (the quaternary ammonium salt was added at 0.7 mmol per kg of the crude polyacetal copolymer calculated on the basis of a quaternary ammonium nitrogen), which had been adjusted to a defined concentration, were added and uniformly mixed.

Then, the mixture was supplied into a twin-shaft extruder having a vent opening. The mixture was melted and kneaded, setting the extruder at the vent vacuum level of 2.7 kPa (20 mmHg) and the cylinder temperature of 200° C. for the average residence time of 300 seconds, while removing volatile matters out of a vent opening, thereby obtaining a stabilized polyacetal copolymer in a pellet form.

Manufacture Example 2-I-7

To 100 parts by weight of the crude polyacetal copolymer (A) described above, 1 part by weight of an aqueous solution containing the quaternary ammonium salt of polycarboxylic acid shown in Table 3 (the quaternary ammonium salt was added at 1.4 mmol per kg of the crude polyacetal copolymer calculated on the basis of a quaternary ammonium nitrogen), which had been adjusted to a defined concentration, was uniformly mixed and dried.

Then, to 100 parts by weight of the crude polyacetal copolymer, 0.3 part by weight of triethyleneglycol [3-(3-t-butyl-5-methyl-4-hydroxyphenyl)propionate] was added, and supplied into a twin-shaft extruder having a vent opening. To 100 parts by weight of the crude polyacetal copolymer being fed in the extruder, 0.5 part by weight of water was injected. The mixture was melted and kneaded, setting the extruder at the vent vacuum level of 2.7 kPa and the cylinder temperature of 200° C. for the average residence time of 300 seconds, while removing volatile matters out of a vent opening, thereby obtaining a stabilized polyacetal copolymer in a pellet form.

Manufacture Example 2-I-8

To 100 parts by weight of the crude polyacetal copolymer (A) described above, 1 part by weight of a methanol solution containing the quaternary ammonium salt of polycarboxylic acid shown in Table 3 (the quaternary ammonium salt was added at 1.4 mmol per kg of the crude polyacetal copolymer calculated on the basis of a quaternary ammonium nitrogen), which had been adjusted to a defined concentration, was uniformly mixed and dried.

Then, to 100 parts by weight of the crude polyacetal copolymer, 0.3 part by weight of triethyleneglycol [3-(3-t-butyl-5-methyl-4-hydroxyphenyl)propionate] was added, and supplied into a twin-shaft extruder having a vent opening. To 100 parts by weight of the crude polyacetal copolymer being fed in the extruder, 0.5 part by weight of water was injected. The mixture was melted and kneaded, setting the extruder at the vent vacuum level of 2.7 kPa and the cylinder temperature of 200° C. for the average residence time of 300 seconds, while removing volatile matters out of a vent opening, thereby obtaining a stabilized polyacetal copolymer in a pellet form.

Manufacture Example 2-I-9

To 100 parts by weight of the crude polyacetal copolymer (A), 1 part by weight of an aqueous solution containing the quaternary ammonium salt of polycarboxylic acid shown in Table 3 (the quaternary ammonium salt was added at 1.4 mmol per kg of the crude polyacetal copolymer calculated on the basis of a quaternary ammonium nitrogen), which had been adjusted to a defined concentration, was uniformly mixed and dried.

Then, to 100 parts by weight of the crude polyacetal copolymer, 0.3 part by weight of triethyleneglycol [3-(3-t-butyl-5-methyl-4-hydroxyphenyl)propionate], 0.05 part by weight of nylon-6,6 (average particle size: 3 μm), 0.1 part by weight of calcium stearate and 0.2 part by weight of ethylene bis-stearyl amide were mixed, and then supplied into a twin-shaft extruder having a vent opening. To 100 parts by weight of the crude polyacetal copolymer being fed in the extruder, 0.5 part by weight of water was injected. The mixture was melted and kneaded, setting the extruder at the vent vacuum level of 2.7 kPa and the cylinder temperature of 200° C. for the average residence time of 300 seconds, while removing volatile matters out of a vent opening, thereby obtaining a stabilized polyacetal copolymer in a pellet form.

Comparative Manufacture Example 2-1

To 100 parts by weight of the crude polyacetal copolymer (A) described above, 0.3 part by weight of triethyleneglycol [3-(3-t-butyl-5-methyl-4-hydroxyphenyl)propionate] and 2 parts by weight of the aqueous solution of triethylamine (abbreviated as TEA) (at the concentration of 0.72% by weight: triethylamine was added at 1.4 mmol per kg of the crude polyacetal copolymer calculated on the basis of a tertiary amine nitrogen) were added and uniformly mixed.

Then, the mixture was supplied into a twin-shaft extruder having a vent opening. The mixture was melted and kneaded, setting the extruder at the vent vacuum level of 20 mmHg (2.7 kPa) and the cylinder temperature of 200° C. for the average residence time of 300 seconds, while removing volatile matters out of a vent opening, thereby obtaining a stabilized polyacetal copolymer in a pellet form.

Comparative Manufacture Example 2-2

To 100 parts by weight of the crude polyacetal copolymer (A) described above, 0.3 part by weight of triethyleneglycol [3-(3-t-butyl-5-methyl-4-hydroxyphenyl)propionate] and 2 parts by weight of an aqueous solution containing the quaternary ammonium salt of the organic carboxylic acid described below (the quaternary ammonium salt was at 1.4 mmol per kg of the crude polyacetal copolymer calculated on the basis of a quaternary ammonium nitrogen), which had been adjusted to a defined concentration, were added and uniformly mixed.

Then, the mixture was supplied into a twin-shaft extruder having a vent opening. The mixture was melted and kneaded, setting the extruder at the vent vacuum level of 20 mmHg (2.7 kPa) and the cylinder temperature of 200° C. for the average residence time of 300 seconds, while removing volatile matters out of a vent opening, thereby obtaining a stabilized polyacetal copolymer in a pellet form.

In each stabilized polyacetal resin of Manufacture Example and Comparative Manufacture Example, melt index=9 g/10 minutes.

The above results are summarized into Table 3.

The quaternary ammonium salts of polycarboxylic acid used in Manufacture Example 2-I are as follows.

Quaternary ammonium salt in Manufacture Example 2-I-1 (I-A-1): (2-hydroxyethyl)trimethylammonium salt of polyacrylic acid (equimolar salt of acrylic acid unit, number-average molecular weight of polyacrylic acid=7000)

Quaternary ammonium salt in Manufacture Example 2-I-2 (I-A-2): (2-hydroxyethyl)trimethylammonium salt of polyacrylic acid (equimolar salt of acrylic acid unit, number-average molecular weight of polyacrylic acid=5000)

Quaternary ammonium salt in Manufacture Example 2-I-3 (I-A-3): (2-hydroxyethyl)trimethylammonium salt of polyacrylic acid (97 molar % salt of acrylic acid unit, number-average molecular weight of polyacrylic acid=5000)

Quaternary ammonium salt in Manufacture Example 2-I-4 (I-A-4): (2-hydroxyethyl)triethylammonium salt of polyacrylic acid (equimolar salt of acrylic acid unit, molecular weight of polyacrylic acid=7000)

Quaternary ammonium salt in Manufacture Example 2-I-5 (I-A-5): tetramethylammonium salt of polyacrylic acid (equimolar salt of acrylic acid unit, number-average molecular weight of polyacrylic acid=7000)

Quaternary ammonium salt in Manufacture Example 2-I-6 (I-A-6): tetrakis(2-hydroxyethyltrimethylammonium) salt of 1,2,3,4-butanetetracarboxylic acid Quaternary ammonium salt of Comparative Manufacture Example 2-2 (A-1): (2-hydroxyethyl)trimethylammonium salt of formic acid (I-2) Examples and Comparative Examples of Stabilized Polyacetal Resin Composition and Molded Article Thereof Comparative Example 2-1

To the stabilized polyacetal copolymer (a-T) prepared in the Comparative Manufacture Example 2-1 described above, the above-mentioned formaldehyde scavenger, antioxidant, processing stabilizer and thermostabilizer were mixed at the ratio shown in Table 4, then melted and mixed in a twin-shaft extruder having a diameter of 30 mm to prepare a polyacetal resin composition in a pellet form. The resulting pellet was formed into defined test pieces using a injection molding machine. The amounts of formaldehyde generated were measured on these defined test pieces.

Examples 2-I-1 to 2-I-7

Using the above stabilized polyacetal copolymer in a pellet form obtained in Manufacture Example, the quality of the stabilized polyacetal resin composition was evaluated in the same manner as Comparative Example 2-1 except for mixing it with the above described formaldehyde scavenger, antioxidant, processing stabilizer and thermostabilizer at the ratio shown in Table 4.

The results are summarized into Table 4.

(II-1) Manufacture Examples and Comparative Manufacture Examples of Stabilized Polyacetal Copolymer Using Quaternary Ammonium Salt of Aminocarboxylic Acid Manufacture Examples 2-II-1 to 2-II-7

To 100 parts by weight of the crude polyacetal copolymer (A) described above, 0.3 part by weight of triethyleneglycol [3-(3-t-butyl-5-methyl-4-hydroxyphenyl)propionate] and 2 parts by weight of an aqueous solution containing the quaternary ammonium salt of aminocarboxylic acid described below (the quaternary ammonium salt was added at 1.4 mmol per kg of the crude polyacetal copolymer calculated on the basis of a quaternary ammonium nitrogen), which had been adjusted to a defined concentration, were added and uniformly mixed.

Then, the mixture was supplied into a twin-shaft extruder having a vent opening. The mixture was melted and kneaded, setting the extruder at the vent vacuum level of 2.7 kPa (20 mmHg) and the cylinder temperature of 200° C. for the average residence time of 300 seconds, while removing volatile matters out of a vent opening, thereby obtaining a stabilized polyacetal copolymer in a pellet form.

Manufacture Example 2-II-8

To 100 parts by weight of the crude polyacetal copolymer (A) described above, 0.3 part by weight of triethyleneglycol [3-(3-t-butyl-5-methyl-4-hydroxyphenyl)propionate] and 2 parts by weight of an aqueous solution containing the quaternary ammonium salt of aminocarboxylic acid shown in Table 5 (the quaternary ammonium salt was added at 0.7 mmol per kg of the crude polyacetal copolymer calculated on the basis of a quaternary ammonium nitrogen), which had been adjusted to a defined concentration, were added and uniformly mixed.

Then, the mixture was supplied into a twin-shaft extruder having a vent opening. The mixture was melted and kneaded, setting the extruder at the vent vacuum level of 2.7 kPa (20 mmHg) and the cylinder temperature of 200° C. for the average residence time of 300 seconds, while removing volatile matters out of a vent opening, thereby obtaining a stabilized polyacetal copolymer in a pellet form.

Manufacture Example 2-II-9

To 100 parts by weight of the crude polyacetal copolymer (A) described above, 1 part by weight of an aqueous solution containing the quaternary ammonium salt of aminocarboxylic acid shown in Table 5 (the quaternary ammonium salt was added at 1.4 mmol per kg of the crude polyacetal copolymer calculated on the basis of a quaternary ammonium nitrogen), which had been adjusted to a defined concentration, was uniformly mixed and dried.

Then, to 100 parts by weight of the crude polyacetal copolymer, 0.3 part by weight of triethyleneglycol [3-(3-t-butyl-5-methyl-4-hydroxyphenyl)propionate] was added, and supplied into a twin-shaft extruder having a vent opening. To 100 parts by weight of the crude polyacetal copolymer being fed in the extruder, 0.5 part by weight of water was injected. The mixture was melted and kneaded, setting the extruder at the vent vacuum level of 2.7 kPa and the cylinder temperature of 200° C. for the average residence time of 300 seconds, while removing volatile matters out of a vent opening, thereby obtaining a stabilized polyacetal copolymer in a pellet form.

Manufacture Example 2-II-10

To 100 parts by weight of the crude polyacetal copolymer (A) described above, 1 part by weight of a methanol solution containing the quaternary ammonium salt of aminocarboxylic acid shown in Table 5 (the quaternary ammonium salt was added at 1.4 mmol per kg of the crude polyacetal copolymer calculated on the basis of a quaternary ammonium nitrogen), which had been adjusted to a defined concentration, was uniformly mixed and dried.

Then, to 100 parts by weight of the crude polyacetal copolymer, 0.3 part by weight of triethyleneglycol [3-(3-t-butyl-5-methyl-4-hydroxyphenyl)propionate] was added, and supplied into a twin-shaft extruder having a vent opening. To 100 parts by weight of the crude polyacetal copolymer being fed in the extruder, 0.5 part by weight of water was injected. The mixture was melted and kneaded, setting the extruder at the vent vacuum level of 2.7 kPa and the cylinder temperature of 200° C. for the average residence time of 300 seconds, while removing volatile matters out of a vent opening, thereby obtaining a stabilized polyacetal copolymer in a pellet form.

Manufacture Example 2-II-11

To 100 parts by weight of the crude polyacetal copolymer (A) described above, 1 part by weight of an aqueous solution containing the quaternary ammonium salt of aminocarboxylic acid shown in Table 5 (the quaternary ammonium salt was added at 1.4 mmol per kg of the crude polyacetal copolymer calculated on the basis of a quaternary ammonium nitrogen), which had been adjusted to a defined concentration, was uniformly mixed and dried.

Then, to 100 parts by weight of the crude polyacetal copolymer, 0.3 part by weight of triethyleneglycol [3-(3-t-butyl-5-methyl-4-hydroxyphenyl)propionate], 0.05 part by weight of nylon-6,6 (average particle size: 4 μm), 0.1 part by weight of calcium stearate and 0.2 part by weight of ethylene bis-stearyl amide were mixed, then supplied into a twin-shaft extruder having a vent opening. To 100 parts by weight of the crude polyacetal copolymer being fed in the extruder, 0.5 part by weight of water was injected. The mixture was melted and kneaded, setting the extruder at the vent vacuum level of 2.7 kPa and the cylinder temperature of 200° C. for the average residence time of 300 seconds, while removing volatile matters out of a vent opening, thereby obtaining a stabilized polyacetal copolymer in a pellet form.

In each stabilized polyacetal resin of Manufacture Example and Comparative Manufacture Example, melt index=9 g/10 minutes.

The results are summarized into Table 5.

Quaternary ammonium salt of Manufacture Example 2-II-1 (II-A-1): tetrakis[(2-hydroxyethyl)trimethylammonium] salt of ethylenediaminetetraacetic acid Quaternary ammonium salt of Manufacture Example 2-II-2 (II-A-2): pentakis[(2-hydroxyethyl)trimethylammonium] salt of diethylenetriaminepentaacetic acid Quaternary ammonium salt of Manufacture Example 2-II-3 (II-A-3): tetrakis[(2-hydroxyethyl)trimethylammonium] salt of 1,3-propanediaminetetraacetic acid Quaternary ammonium salt of Manufacture Example 2-II-4 (II-A-4): tris[(2-hydroxyethyl)trimethylammonium] salt of hydroxyethylethylenediaminetriacetic acid Quaternary ammonium salt of Manufacture Example 2-II-5 (II-A-5): tetrakis[(2-hydroxyethyl)trimethylammonium] salt of glycoletherdiaminetetraacetic acid Quaternary ammonium salt of Manufacture Example 2-II-6 (II-A-6): tris[(2-hydroxyethyl)triethylammonium] salt of ethylenediaminetetraacetic acid Quaternary ammonium salt of Manufacture Example 2-II-7 (II-A-7): tetrakis(tetramethylammonium) salt of ethylenediaminetetraacetic acid (II-2) Examples and Comparative Examples of stabilized Polyacetal Resin Composition and Molded Article Thereof Examples 2-II-1 to 2-II-8

Using the above stabilized polyacetal copolymer in a pellet form in Manufacture Example, the amounts of formaldehyde generated were measured on test pieces formed from the stabilized polyacetal resin composition in the same manner as Comparative Example 2-1 described above, except for mixing it with the above described formaldehyde scavenger, antioxidant, processing stabilizer and thermostabilizer at the ratio shown in Table 6.

The results are summarized into Table 6.

Examples Using the Quaternary Ammonium Salt of (III)

In each Examples, (method for determining evaluation properties of the stabilized polyacetal resin) and (method for determining evaluation properties of the stabilized polyacetal resin composition) used as quality indices are as described above.

Further, the formaldehyde scavenger (b), hindered phenol-based antioxidant (c), processing stabilizer (d) and thermostabilizer (formic acid scavenger) (e) used in Examples and Comparative Examples are also as described above.

Melt indices are also as described above.

(Preparation of Crude Polyacetal Copolymer (A) for Stabilization Treatment)

According to the same manufacture methods and manufacture conditions as those described above, a crude polyacetal copolymer (A) was obtained.

The amount of terminal group of hemiacetal of the crude polyacetal copolymer (A) was 2.2 mmol/kg, the amount of terminal group of formyl thereof was 1.5 mmol/kg, and the amount of unstable terminal (the amount of unstable terminal portion) thereof was 0.87% by weight.

Comparative Manufacture Examples 3-1 and 3-2, and Comparative Example 3-1 given below are shared to individual Examples in (i) to (v) below.

In the following, for each kind of the quaternary ammonium salts, (1) Manufacture Examples and Comparative Manufacture Examples of the stabilized polyacetal resin are described, and then (2) Examples and Comparative Examples of the composition using the stabilized polyacetal resin and the molded article thereof are described separately.

(i-1) Manufacture Examples and Comparative Manufacture Examples of Stabilized Polyacetal Copolymer Using Quaternary Ammonium Salt in which the Compound for Counter-Anions is Carbonic Acid Monoester or Metal Bicarbonate Manufacture Examples 3-i-1 to 3-i-3

To 100 parts by weight of the crude polyacetal copolymer (A) described above, 0.3 part by weight of triethyleneglycol [3-(3-t-butyl-5-methyl-4-hydroxyphenyl)propionate] and 2 parts by weight of an aqueous solution containing the quaternary ammonium salt of carbonic acid monoester or the quaternary ammonium salt of bicarbonate metal in a defined percentage by weight (the quaternary ammonium salt was at 1.4 mmol per kg of the crude polyacetal copolymer calculated on the basis of a nitrogen of quaternary ammonium) were added and uniformly mixed.

Then, the mixture was supplied into a twin-shaft extruder having a vent opening (30 mm in diameter), and melted and kneaded, setting the extruder at the vent vacuum level of 2.7 kPa (20 mmHg) and the cylinder temperature of 200° C. for the average residence time of 300 seconds, while removing volatile matters out of a vent opening, thereby obtaining a stabilized polyacetal copolymer in a pellet form.

Manufacture Example 3-i-4

To 100 parts by weight of the crude polyacetal copolymer (A) described above, 0.3 part by weight of pentaerythritol [3-(3,5-di-t-butyl-4-hydroxyphenyl)propionate] and 2 parts by weight of an aqueous solution containing the quaternary ammonium salt of carbonic acid monoester in a defined percentage by weight (the quaternary ammonium salt was at 0.7 mmol per kg of the crude polyacetal copolymer calculated on the basis of a nitrogen of quaternary ammonium) were added and uniformly mixed.

The mixture was supplied into a twin-shaft extruder having a vent opening. The mixture was melted and kneaded, setting the extruder at the vent vacuum level of 2.7 kPa (20 mmHg) and the cylinder temperature of 200° C. for the average residence time of 300 seconds, while removing volatile matters out of a vent opening, thereby obtaining a stabilized polyacetal copolymer in a pellet form.

Manufacture Example 3-i-5

To 100 parts by weight of the crude polyacetal copolymer (A) described above, 1 part by weight of an aqueous solution containing the quaternary ammonium salt of carbonic acid monoester in a defined percentage by weight (the quaternary ammonium salt was at 1.4 mmol per kg of the crude polyacetal copolymer calculated on the basis of a nitrogen of quaternary ammonium) was uniformly mixed and dried.

Then, to 100 parts by weight of the crude polyacetal copolymer, 0.3 part by weight of triethyleneglycol [3-(3-t-butyl-5-methyl-4-hydroxyphenyl)propionate] was added, and supplied into a twin-shaft extruder having a vent opening. To 100 parts by weight of the crude polyacetal copolymer being fed in the extruder, 0.5 part by weight of water was injected. The mixture was melted and kneaded, setting the extruder at the vent vacuum level of 2.7 kPa and the cylinder temperature of 200° C. for the average residence time of 300 seconds, while removing volatile matters out of a vent opening, thereby obtaining a stabilized polyacetal copolymer in a pellet form.

Manufacture Examples 3-i-6 and 3-i-7

To 100 parts by weight of the crude polyacetal copolymer (A) described above, 1 part by weight of a methanol solution containing the quaternary ammonium salt of carbonic acid monoester in a defined percentage by weight (the quaternary ammonium salt was at 1.4 mmol per kg of the crude polyacetal copolymer calculated on the basis of a nitrogen of quaternary ammonium) was uniformly mixed and dried.

Then, to 100 parts by weight of the crude polyacetal copolymer, 0.3 part by weight of triethyleneglycol [3-(3-t-butyl-5-methyl-4-hydroxyphenyl)propionate] was added, and supplied into a twin-shaft extruder having a vent opening. To 100 parts by weight of the crude polyacetal copolymer being fed in the extruder, 0.5 part by weight of water was injected. The mixture was melted and kneaded, setting the extruder at the vent vacuum level of 2.7 kPa and the cylinder temperature of 200° C. for the average residence time of 300 seconds, while removing volatile matters out of a vent opening, thereby obtaining a stabilized polyacetal copolymer in a pellet form.

Manufacture Example 3-i-8

To 100 parts by weight of the crude polyacetal copolymer (A) described above, 1 part by weight of an aqueous solution containing the quaternary ammonium salt of carbonic acid monoester in a defined percentage by weight (the quaternary ammonium salt was at 1.4 mmol per kg of the crude polyacetal copolymer calculated on the basis of a nitrogen of quaternary ammonium) was uniformly mixed and dried.

Then, to 100 parts by weight of the crude polyacetal copolymer, 0.3 part by weight of triethyleneglycol [3-(3-t-butyl-5-methyl-4-hydroxyphenyl)propionate], 0.05 part by weight of nylon-6,6 (average particle size: 3 μm), 0.1 part by weight of calcium stearate, and 0.2 part by weight of ethylene bis-stearyl amide were mixed, and supplied into a twin-shaft extruder having a vent opening. To 100 parts by weight of the crude polyacetal copolymer being fed in the extruder, 0.5 part by weight of water was injected. The mixture was melted and kneaded, setting the extruder at the vent vacuum level of 2.7 kPa and the cylinder temperature of 200° C. for the average residence time of 300 seconds, while removing volatile matters out of a vent opening, thereby obtaining a stabilized polyacetal copolymer in a pellet form.

Comparative Manufacture Example 3-1

To 100 parts by weight of the crude polyacetal copolymer (A) described above, 0.3 part by weight of triethyleneglycol [3-(3-t-butyl-5-methyl-4-hydroxyphenyl)propionate] and 2 parts by weight of the aqueous solution containing triethylamine (abbreviated as TEA) (at the concentration of 0.72% by weight: triethylamine was added at 1.4 mmol per kg of the crude polyacetal copolymer calculated on the basis of a nitrogen of tertiary amine) were added and uniformly mixed.

Then, the mixture was supplied into a twin-shaft extruder having a vent opening. The mixture was melted and kneaded, setting the extruder at 20 mmHg (2.7 kPa) of vent vacuum, cylinder temperature of 200° C. and for the average residence time of 300 seconds, while removing volatile matters out of a vent opening, thereby obtaining a stabilized polyacetal copolymer in a pellet form.

Comparative Manufacture Example 3-2

To 100 parts by weight of the crude polyacetal copolymer (A) described above, 0.3 part by weight of triethyleneglycol [3-(3-t-butyl-5-methyl-4-hydroxyphenyl)propionate] and 2 parts by weight of an aqueous solution containing the quaternary ammonium salt of organic carboxylic acid in a defined percentage by weight (the quaternary ammonium salt was added at 1.4 mmol per kg of the crude polyacetal copolymer calculated on the basis of a nitrogen of quaternary ammonium) were added and uniformly mixed.

Then, the mixture was supplied into a twin-shaft extruder having a vent opening. The mixture was melted and kneaded, setting the extruder at 20 mmHg (2.7 kPa) of vent vacuum, cylinder temperature of 200° C. and for the average residence time of 300 seconds, while removing volatile matters out of a vent opening, thereby obtaining a stabilized polyacetal copolymer in a pellet form.

The melt indices of each stabilized polyacetal copolymers obtained in Manufacture Examples and Comparative Manufacture Examples are 9 g/10 min.

The results are given in Table 7.

The quaternary ammonium salts of carbonic acid monoester and bicarbonate metal used in the Manufacture Examples are the following.
(i-A-1): Tetramethylammonium salt of monomethyl carbonate [Tetramethylammoniummonomethyl carbonate]
(i-A-2): (2-Hydroxyethyl)trimethylammonium salt of monomethyl carbonate [(2-Hydroxyethyl)trimethylammoniummonomethyl carbonate]
(i-A-3): (2-Hydroxyethyl)trimethylammonium salt of calcium bicarbonate [(2-Hydroxylethyl)trimethylammonium calcium carbonate]

The quaternary ammonium salt of aliphatic carboxylate used in Comparative Manufacture Examples is the following.
(A-I): (2-Hydroxyethyl)trimethylammonium Salt of Formic Acid (i-2) Examples and Comparative Examples of stabilized Polyacetal Resin Composition and Molded Article Thereof Examples 3-i-1 to 3-i-7

To 100 parts by weight of pellet-formed stabilized polyacetal copolymer obtained in the above Manufacture Examples, a formaldehyde scavenger, antioxidant, processing stabilizer and thermostabilizer (formic acid scavenger) were mixed at the ratio shown in Table 8, then melted and kneaded in a twin-shaft extruder having a diameter of 30 mm and a vent opening to prepare a polyacetal resin composition in a pellet form. The pellet was formed into defined test pieces using an injection molding machine. The amounts of formaldehyde generated were measured on the defined test pieces. The results are given in Table 8.

Comparative Example 3-i-1

To a stabilized polyacetal copolymer prepared by applying triethylamine instead of quaternary ammonium salt, which showed different polymer quality indices from the indices of above-prepared one, a formaldehyde scavenger, antioxidant, processing stabilizer and thermostabilizer (formic acid scavenger) were mixed at the ratio shown in Table 8, then melted and kneaded in a twin-shaft extruder having a diameter of 30 mm and a vent opening to prepare a polyacetal resin composition in a pellet form. The pellet was formed in to defined test pieces using an injection molding machine. The amounts of formaldehyde generated were measured on the defined test pieces. The results are given in Table 8.

The polyacetal copolymers used in Examples and Comparative Example are the following.
(i-a-1): The stabilized polyacetal copolymer prepared in Manufacture Example 3-i-1 (amount of terminal group of hemiacetal=0.4 mmol/kg, amount of terminal group of formyl=0.1 mmol/kg, amount of unstable terminal=0.18% by weight, and melt index=9 g/10 min)
(a-2): The stabilized polyacetal copolymer prepared in Comparative Manufacture Example 3-1 (amount of terminal group of hemiacetal=1.7 mmol/kg, amount of terminal group of formyl=1.4 mmol/kg, amount of unstable terminal=0.74% by weight, and melt index=9 g/10 min)

(ii-1) Manufacture Examples of Stabilized Polyacetal Copolymer Using Quaternary Ammonium Salt in which the Compound for Counter-Anions is Acidic Enol-Based Compound Manufacture Examples 3-ii-1 to 3-ii-5

To 100 parts by weight of the crude polyacetal copolymer (A) described above, 0.3 part by weight of pentaerythritol [3-(3,5-di-t-butyl-4-hydroxyphenyl)propionate] and 2 parts by weight of an aqueous solution containing the quaternary ammonium salt of acidic enol-based compound in a defined percentage by weight (the quaternary ammonium salt was added at 1.4 mmol per kg of the crude polyacetal copolymer calculated on the basis of a nitrogen of quaternary ammonium) were added and uniformly mixed.

Then, the mixture was supplied into a twin-shaft extruder having a vent opening. The mixture was melted and kneaded, setting the extruder at the vent vacuum level of 2.7 kPa (20 mmHg) and the cylinder temperature of 200° C. for the average residence time of 300 seconds, while removing the volatile matters from the vent opening, thereby obtaining a stabilized polyacetal copolymer in a pellet form.

Manufacture Example 3-ii-6

To 100 parts by weight of the crude polyacetal copolymer (A) described above, 0.3 part by weight of triethyleneglycol [3-(3-t-butyl-5-methyl-4-hydroxyphenyl)propionate] and 2 parts by weight of an aqueous solution containing the quaternary ammonium salt of acidic enol-based compound in a defined percentage by weight (the quaternary ammonium salt was added at 0.7 mmol per kg of the crude polyacetal copolymer calculated on the basis of a nitrogen of quaternary ammonium) were added and uniformly mixed.

Then, the mixture was supplied into a twin-shaft extruder having a vent opening. The mixture was melted and kneaded, setting the extruder at the vent vacuum level of 2.7 kPa (20 mmHg) and the cylinder temperature of 200° C. for the average residence time of 300 seconds, while removing the volatile matters from the vent opening, thereby obtaining a stabilized polyacetal copolymer in a pellet form.

Manufacture Example 3-ii-7

To 100 parts by weight of the crude polyacetal copolymer (A) described above, 1 part by weight of an aqueous solution containing the quaternary ammonium of acidic enol compound in a defined percentage by weight (the quaternary ammonium salt was added at 1.4 mmol per kg of the crude polyacetal copolymer calculated on the basis of a nitrogen of quaternary ammonium) was uniformly mixed and dried.

Then, to 100 parts by weight of the crude polyacetal copolymer, 0.3 part by weight of triethyleneglycol [3-(3-t-butyl-5-methyl-4-hydroxyphenyl)propionate] was added, and supplied into a twin-shaft extruder having a vent opening. To 100 parts by weight of the crude polyacetal copolymer being fed in the extruder, 0.5 part by weight of water was injected. The mixture was melted and kneaded, setting the extruder at the vent vacuum level of 2.7 kPa and the cylinder temperature of 200° C. for the average residence time of 300 seconds, while removing volatile matters out of a vent opening, thereby obtaining a stabilized polyacetal copolymer in a pellet form.

Manufacture Example 3-ii-8

To 100 parts by weight of the crude polyacetal copolymer (A) described above, 1 part by weight of a methanol solution containing the quaternary ammonium of acidic enol compound in a defined percentage by weight (the quaternary ammonium salt was added at 1.4 mmol per kg of the crude polyacetal copolymer calculated on the basis of a nitrogen of quaternary ammonium) was uniformly mixed and dried.

Then, to 100 parts by weight of the crude polyacetal copolymer, 0.3 part by weight of triethyleneglycol [3-(3-t- butyl-5-methyl-4-hydroxyphenyl)propionate] was added, and supplied into a twin-shaft extruder having a vent opening. To 100 parts by weight of the crude polyacetal copolymer being fed in the extruder, 0.5 part by weight of water was injected. The mixture was melted and kneaded, setting the extruder at the vent vacuum level of 2.7 kPa and the cylinder temperature of 200° C. for the average residence time of 300 seconds, while removing volatile matters out of a vent opening, thereby obtaining a stabilized polyacetal copolymer in a pellet form.

Manufacture Example 3-ii-9

To 100 parts by weight of the crude polyacetal copolymer (A) described above, 1 part by weight of an aqueous solution containing the quaternary ammonium of acidic enol compound in a defined percentage by weight (the quaternary ammonium salt was added at 1.4 mmol per kg of the crude polyacetal copolymer calculated on the basis of a nitrogen of quaternary ammonium) was uniformly mixed and dried.

Then, to 100 parts by weight of the crude polyacetal copolymer, 0.3 part by weight of triethyleneglycol [3-(3-t-butyl-5-methyl-4-hydroxyphenyl)propionate], 0.05 part by weight of nylon-6,6, (average particle size: 3 μm), 0.1 part by weight of calcium stearate, and 0.2 part by weight of ethylene bis-stearyl amide were mixed and supplied into a twin-shaft extruder having a vent opening. To 100 parts by weight of the crude polyacetal copolymer being fed in the extruder, 0.5 part by weight of water was injected. The mixture was melted and kneaded, setting the extruder at the vent vacuum level of 2.7 kPa and the cylinder temperature of 200° C. for the average residence time of 300 seconds, while removing volatile matters out of a vent opening, thereby obtaining a stabilized polyacetal copolymer in a pellet form.

Melt indices of each of the stabilized polyacetal copolymers obtained in Manufacture Examples and Comparative Manufacture Examples are 9 g/10 min.

The results are summarized in Table 9.

The quaternary ammonium salts of acidic enol compound used in Manufacture Examples are the following.
(ii-A-1): (2-Hydroxyethyl)trimethylammonium salt of acetylacetone
(ii-A-2): (2-Hydroxyethyl)trimethylammonium salt of ethyl acetoacetate
(ii-A-3): (2-Hydroxyethyl)trimethylammonium salt of dehydro acetate
(ii-A-4): (2-Hydroxyethyl)triethylammonium salt of acetylacetone
(ii-A-5): Tetramethylammonium salt of acetylacetone
(ii-A-6): (2-Hydroxyethyl)trimethylammonium salt of ascorbic acid (ii-2) Examples and Comparative Examples of stabilized Polyacetal Resin Composition and Molded Article Thereof Examples 3-ii-1 to 3-ii-7

To 100 parts by weight of pellet-formed stabilized polyacetal copolymer obtained in the above Manufacture Examples, a formaldehyde scavenger, antioxidant, processing stabilizer, and thermostabilizer (formic acid scavenger) were mixed at the ratio shown in Table 10. Then, the mixture was melt and kneaded in a twin-shaft extruder having a diameter of 30 mm and a vent opening to prepare a polyacetal resin composition in a pellet form. The pellet was formed into defined test pieces using an injection molding machine. The amounts of formaldehyde generated were measured on the defined test pieces.

The results are shown in Table 10.

The polyacetal copolymers used in Examples are the following.
(ii-a-1): The stabilized polyacetal copolymer prepared in Manufacture Example 3-ii-1 (amount of terminal group of hemiacetal=0.4 mmol/kg, amount of terminal group of formyl=0.1 mmol/kg, amount of unstable terminal=0.18% by weight, and melt index=9 g/10 min)
(ii-a-2): The stabilized polyacetal copolymer prepared in Manufacture Example 3-ii-2 (amount of terminal group of hemiacetal=0.2 mmol/kg, amount of terminal group of formyl=0.1 mmol/kg, amount of unstable terminal=0.18% by weight, and melt index=9 g/10 min)

(iii-1) Manufacture Examples and Comparative Manufacture Examples of Stabilized Polyacetal Copolymer Using Quaternary Ammonium Salt in which the Compound for Counter-Anions is Phenol-Based and Alcohol-Based Compounds Manufacture Examples 3-iii-1 to 3-iii-3

To 100 parts by weight of the crude polyacetal copolymer (A) described above, 0.3 part by weight of pentaerythritol [3-(3,5-di-t-butyl-4-hydroxyphenyl)propionate] and 2 parts by weight of an aqueous solution containing a quaternary ammonium aryl oxide salt in a defined percentage by weight (the quaternary ammonium salt was added at 1.4 mmol per kg of the crude polyacetal copolymer calculated on the basis of a nitrogen of quaternary ammonium) were added and uniformly mixed.

Then, the mixture was supplied into a twin-shaft extruder having a vent opening. The mixture was melted and kneaded, setting the extruder at the vent vacuum level of 2.7 kPa (20 mmHg) and the cylinder temperature of 200° C. for the average residence time of 300 seconds, while removing the volatile matters from the vent opening, thereby obtaining a stabilized polyacetal copolymer in a pellet form.

Manufacture Example 3-iii-4

To 100 parts by weight of the crude polyacetal copolymer (A) described above, 0.3 part by weight of triethyleneglycol [3-(3-t-butyl-5-methyl-4-hydroxyphenyl)propionate] and 2 parts by weight of an aqueous solution containing a quaternary ammonium aryl oxide salt in a defined percentage by weight (the quaternary ammonium salt was added at 0.7 mmol per kg of the crude polyacetal copolymer calculated on the basis of a nitrogen of quaternary ammonium) were added and uniformly mixed.

Then, the mixture was supplied into a twin-shaft extruder having a vent opening. The mixture was melted and kneaded, setting the extruder at the vent vacuum level of 2.7 kPa (20 mmHg) and the cylinder temperature of 200° C. for the average residence time of 300 seconds, while removing the volatile matters from the vent opening, thereby obtaining a stabilized polyacetal copolymer in a pellet form.

Manufacture Example 3-iii-5

To 100 parts by weight of the crude polyacetal copolymer (A) described above, 1 part by weight of an aqueous solution containing a quaternary ammonium aryl oxide salt in a defined percentage by weight (the quaternary ammonium salt was added at 1.4 mmol per kg of the crude polyacetal copolymer calculated on the basis of a nitrogen of quaternary ammonium) was uniformly mixed and dried.

Then, to 100 parts by weight of the crude polyacetal copolymer, 0.3 part by weight of triethyleneglycol [3-(3-t-butyl-5-methyl-4-hydroxyphenyl)propionate] was added, and supplied into a twin-shaft extruder having a vent opening. To 100 parts by weight of the crude polyacetal copolymer being fed in the extruder, 0.5 part by weight of water was injected. The mixture was melted and kneaded, setting the extruder at the vent vacuum level of 2.7 kPa and the cylinder temperature of 200° C. for the average residence time of 300 seconds, while removing volatile matters out of a vent opening, thereby obtaining a stabilized polyacetal copolymer in a pellet form.

Manufacture Examples 3-iii-6 and 3-iii-7

To 100 parts by weight of the crude polyacetal copolymer (A) described above, 1 part by weight of a methanol solution containing a quaternary ammonium alkoxide salt or quaternary ammonium aryl oxide salt in a defined percentage by weight (the quaternary ammonium salt was added at 1.0 mmol per kg of the crude polyacetal copolymer calculated on the basis of a nitrogen of quaternary ammonium) was uniformly mixed and dried.

Then, to 100 parts by weight of the crude polyacetal copolymer, 0.3 part by weight of pentaerythritol [3-(3,5-di-t-butyl-4-hydroxyphenyl)propionate] was added, and supplied into a twin-shaft extruder having a vent opening. To 100 parts by weight of the crude polyacetal copolymer being fed in the extruder, 0.5 part by weight of water was injected. The mixture was melted and kneaded, setting the extruder at the vent vacuum level of 2.7 kPa and the cylinder temperature of 200° C. for the average residence time of 300 seconds, while removing volatile matters out of a vent opening, thereby obtaining a stabilized polyacetal copolymer in a pellet form.

Manufacture Example 3-iii-8

To 100 parts by weight of the crude polyacetal copolymer (A) described above, 1 part by weight of an aqueous solution containing a quaternary ammonium aryl oxide salt in a defined percentage by weight (the quaternary ammonium salt was added at 1.4 mmol per kg of the crude polyacetal copolymer calculated on the basis of a nitrogen of quaternary ammonium) was uniformly mixed and dried.

Then, to 100 parts by weight of the crude polyacetal copolymer, 0.3 part by weight of triethyleneglycol [3-(3-t-butyl-5-methyl-4-hydroxyphenyl)propionate], 0.05 part by weight of nylon-6,6, (average particle size: 3 μm), 0.1 part by weight of calcium stearate, and 0.2 part by weight of ethylene bis-stearyl amide were mixed and supplied into a twin-shaft extruder having a vent opening. To 100 parts by weight of the crude polyacetal copolymer being fed in the extruder, 0.5 part by weight of water was injected. The mixture was melted and kneaded, setting the extruder at the vent vacuum level of 2.7 kPa and the cylinder temperature of 200° C. for the average residence time of 300 seconds, while removing volatile matters out of a vent opening, thereby obtaining a stabilized polyacetal copolymer in a pellet form.

The results are summarized in Table 11.

The quaternary ammonium aryl oxide salts and the quaternary ammonium alkoxide salts used in Manufacture Examples are the following.

(iii-A-1): Bis [(2-hydroxyethyl)trimethylammonium] salt of bisphenol-A
(iii-A-2): Bis [(2-hydroxyethyl)trimethylammonium] salt of bisphenol-F
(iii-A-3): Bis [(2-hydroxyethyl)trimethylammonium] salt of hydroquinone
(iii-A-4): Mono [(2-hydroxyethyl)triethylammonium] salt of hydroquinone
(iii-A-5): Bis(tetramethylammonium)salt of bisphenol-A
(iii-A-6): Mono [(2-hydroxyethyl)trimethylammonium] salt of methanol [(2-Hydroxyethy)trimethylammonium] methoxide
(iii-A-7): Mono [(2-hydroxyethyl)trimethylammonium] salt of 2,2'-methylene bis(4-methyl-6-t-butylphenol)

(iii-2) Examples and Comparative Examples of Stabilized Polyacetal Resin Composition and Molded Article Thereof Examples 3-iii-1 to 3-iii-7

To 100 parts by weight of pellet-formed stabilized polyacetal copolymer obtained in the above Manufacture Examples, a formaldehyde scavenger, antioxidant, processing stabilizer and thermostabilizer (formic acid scavenger) were mixed at the ratio shown in Table 12. The mixture was supplied into a twin-shaft extruder having a diameter of 30 mm and a vent opening, then melted and kneaded to prepare a polyacetal resin composition in a pellet form. The pellet was formed into defined test pieces using an injection molding machine. The amounts of formaldehyde generated were measured on the test pieces.

The results are summarized in Table 12.

The polyacetal copolymers used in Examples are the following.

(iii-a-1): The stabilized polyacetal copolymer prepared in Manufacture Example 3-iii-1 (amount of terminal group of hemiacetal=0.6 mmol/kg, amount of terminal group of formyl=0 mmol/kg, amount of unstable terminal=0.20% by weight, and melt index=9 g/10 min)

(iii-a-6): The stabilized polyacetal copolymer prepared in Comparative Manufacture Example 3-iii-6 (amount of terminal group of hemiacetal=0.4 mmol/kg, amount of terminal group of formyl=0 mmol/kg, amount of unstable terminal=0.17% by weight, and melt index=9 g/10 min)

(iv-1) Manufacture Examples and Comparative Manufacture Examples of Stabilized Polyacetal Copolymer Using Quaternary Ammonium Salt in which the Compound for Counter-Anions is Acidic Azole-Based Compound Manufacture Example 3-iv-1

To 100 parts by weight of the crude polyacetal copolymer (A) described above, 3 parts by weight of pentaerythritol [3-(3,5'-di-t-butyl-4-hydroxyphenyl)propionate] and 2 parts by weight of the aqueous solution containing the mono [(2-hydroxyethyl)trimethylammonium] salt of theophylline in a defined percentage by weight (the quaternary ammonium salt was added at 1.4 mmol per kg of the crude polyacetal copolymer calculated on the basis of a nitrogen of quaternary ammonium) were added and uniformly mixed.

Then, the mixture was supplied into a twin-shaft extruder having a vent opening. The mixture was melted and kneaded, setting the extruder at the vent vacuum level of 2.7 kPa (20 mmHg) and the cylinder temperature of 200° C. for the average residence time of 300 seconds, while removing the volatile matters from the vent opening, thereby obtaining a stabilized polyacetal copolymer in a pellet form.

The obtained stabilized polyacetal copolymer gave: the amount of terminal group of hemiacetal of 0.5 mmol/kg, the amount of terminal group of formyl of 0.1 mmol/kg, the amount of unstable terminal of 0.17% by weight, the grade of odor property of circle, and melt index of 9 g/10 min.

(iv-2) Examples of Stabilized Polyacetal Resin Composition and of Molded Article Thereof Example 3-iv-1

To 100 parts by weight of pellet-formed stabilized polyacetal copolymer obtained in the above Manufacture Examples, 3 parts by weight of (b-2) formaldehyde scavenger, 0.2 part by weight of (c-1) antioxidant, 0.2 part by weight of (d-1) processing stabilizer, and 0.1 part by weight of (e-1) thermostabilizer were added. Then, the mixture was supplied into a twin-shaft extruder having a diameter of 30 mm and a vent opening, and melted and kneaded to prepare a polyacetal resin in a pellet form. The pellet was formed into defined test pieces using an injection molding machine.

The amounts of formaldehyde generated were measured on the test pieces. The amount of formaldehyde generated in a wet state was 0.2 mmol/cm$^2$, and the amount of formaldehyde generated in a dry state was 0.25 mmol/cm$^2$.

(v-1) Manufacture Examples and Comparative Manufacture Examples of Stabilized Polyacetal Copolymer Using Quaternary Ammonium Salt in which the Compound for Counter-Anions is Non-Carboxylic Acid-Based Compound Selected from the Group Consisting of Organic Sulfur, Phosphorus and Boron Compounds Manufacture Examples 3-v-1 to 3-v-4

To 100 parts by weight of the crude polyacetal copolymer (A) described above, 2 parts by weight of the aqueous solution of the quaternary ammonium compound salt in a defined percentage by weight (the quaternary ammonium salt was added at 1.4 mmol per kg of the crude polyacetal copolymer calculated on the basis of a nitrogen of quaternary ammonium) was uniformly mixed and dried.

Then, to 100 parts by weight of the crude polyacetal copolymer, 0.3 part by weight of triethyleneglycol [3-(3,5-di-t-butyl-4-hydroxyphenyl)propionate] and 0.01 parts by weight of magnesium oxide were mixed and supplied into a twin-shaft extruder having a vent opening. The mixture was melted and kneaded, setting the extruder at the vent vacuum level of 2.7 kPa (20 mmHg) and the cylinder temperature of 200° C. for the average residence time of 300 seconds, while removing the volatile matters from the vent opening, thereby obtaining a stabilized polyacetal copolymer in a pellet form.

Manufacture Example 3-v-5

To 100 parts by weight of the crude polyacetal copolymer (A) described above, 1 part by weight of a methanol solution containing the methanol complex salt of trimethyl borate of quaternary ammonium in a defined percentage by weight (the quaternary ammonium salt was added at 1.0 mmol per kg of the crude polyacetal copolymer calculated on the basis of a nitrogen of quaternary ammonium) was added, uniformly mixed and dried.

Then, to 100 parts by weight of the crude polyacetal copolymer, 0.3 part by weight of triethyleneglycol [3-(3-t-butyl-5-methyl-4-hydroxyphenyl)propionate] was added, and supplied into a twin-shaft extruder having a vent opening. To 100 parts by weight of the crude polyacetal copolymer being fed in the extruder, 0.5 part by weight of water was injected. The mixture was melted and mixed, setting the extruder at the vent vacuum level of 2.7 kPa (20 mmHg) and the cylinder temperature of 200° C. for the average residence time of 300 seconds, while removing volatile matters out of a vent opening, thereby obtaining a stabilized polyacetal copolymer in a pellet form.

Manufacture Example 3-v-6

To 100 parts by weight of the crude polyacetal copolymer (A) described above, 1 part by weight of the ethanol solution containing the ethanol complex salt of triethyl borate of quaternary ammonium in a defined percentage by weight (the quaternary ammonium salt was added at 1.0 mmol per kg of the crude polyacetal copolymer calculated on the basis of a nitrogen of quaternary ammonium) was added, uniformly mixed and dried.

Then, to 100 parts by weight of the crude polyacetal copolymer, 0.3 part by weight of pentaerythritol [3-(3,5-di-t-butyl-4-hydroxyphenyl)propionate] was added, and supplied into a twin-shaft extruder having a vent opening. To 100 parts by weight of the crude polyacetal copolymer being fed in the extruder, 0.5 part by weight of water was injected. The mixture was melted and mixed, setting the extruder at the vent vacuum level of 2.7 kPa (20 mmHg) and the cylinder temperature of 200° C. for the average residence time of 300 seconds, while removing volatile matters out of a vent opening, thereby obtaining a stabilized polyacetal copolymer in a pellet form.

The results are summarized in Table 13.

The quaternary ammonium salts of acidic organic sulfur compound, acidic organic phosphorus compound and acidic organic boron compound, which were used in Manufacture Examples, are the following.

(v-A-1): Mono [(2-hydroxyethyl)trimethylammonium] salt of methane sulfonate
(v-A-2): Tetrakis[tetramethylammonium] salt of 1-hydroxyethylidene-1,1-diphosphonate
(v-A-3): Mono [(2-hydroxyethyl)trimethylammonium] salt of dimethylsulfinate
(v-A-4): Mono [(2-hydroxyethyl)trimethylammonium] salt of phenyl boronate
(v-A-5): Mono [tetramethylammonium] salt of methanol complex of trimethyl borate
(v-A-6): Mono [(2-hydroxyethyl)trimethylammonium] salt of ethanol complex of triethyl borate (v-2) Examples and Comparative Examples of Stabilized Polyacetal Resin Composition and Molded Article Thereof Examples 3-v-1 to 3-v-6

To 100 parts by weight of pellet-formed stabilized polyacetal copolymer obtained in the above Manufacture Examples, a formaldehyde scavenger, antioxidant, processing stabilizer, and thermostabilizer (formic acid scavenger) were added at the ratio shown in Table 14. Then, the mixture was supplied into a twin-shaft extruder having a diameter of 30 mm and a vent opening, then melted and kneaded to prepare a polyacetal resin in a pellet form. The pellet was formed into defined test pieces using an injection molding machine. The amounts of formaldehyde generated were measured on the test pieces.

The above-mentioned results are summarized in Table 14.

The polyacetal copolymers used in Examples are as follows.

(v-a-3): The stabilized polyacetal copolymer prepared in Manufacture Example 3-v-3 (amount of terminal group of hemiacetal=0.5 mmol/kg, amount of terminal group of formyl=0.2 mmol/kg, amount of unstable terminal=0.18% by weight, and melt index=9 g/10 min)

(v-a-6): The stabilized polyacetal copolymer prepared in Comparative Manufacture Example 3-v-6 (amount of terminal group of hemiacetal=0.4 mmol/kg, amount of terminal group of formyl=00 mmol/kg, amount of unstable terminal=0.17% by weight, and melt index=9 g/10 min)

TABLE 1

Stabilized polyacetal copolymer

| | Manufacture Examples | | | | | | | | | | | Comparative Manufacture Examples | |
|---|---|---|---|---|---|---|---|---|---|---|---|---|---|
| | 1-1 | 1-2 | 1-3 | 1-4 | 1-5 | 1-6 | 1-7 | 1-8 | 1-9 | 1-10 | 1-11 | 1-1 | 1-2 |
| Quaternary ammonium salt | A-1 | A-2 | A-3 | A-4 | A-5 | A-6 | A-7 | A-1 | A-1 | A-1 | A-1 | TEA | A-I |
| Stabilized copolymer | a-1 | a-2 | a-3 | a-4 | a-5 | a-6 | a-7 | a-8 | a-9 | a-10 | a-11 | a-T | a-I |
| Amount of terminal group of hemiacetal (mmol/kg) | 0.3 | 0.4 | 0.4 | 0.3 | 0.5 | 0.4 | 0.4 | 0.6 | 0.3 | 0.4 | 0.2 | 1.7 | 0.4 |
| Amount of terminal group of formyl (mmol/kg) | 0 | 0.2 | 0.5 | 0.1 | 0.1 | 0 | 0.2 | 0.3 | 0 | 0 | 0 | 1.4 | 0.1 |
| Amount of unstable terminal (weight %) | 0.17 | 0.17 | 0.18 | 0.19 | 0.20 | 0.16 | 0.18 | 0.22 | 0.16 | 0.16 | 0.16 | 0.74 | 0.22 |
| PC deterioration properties | ○ | ○ | ○ | ○ | ○ | ○ | Δ | ○ | ○ | ○ | ○ | ○ | X |
| Odor property | ○ | ○ | ○ | ○ | ○ | ○ | ○ | Δ | ○ | ○ | ○ | X | X |

TABLE 2

Amount of formaldehyde generated from stabilized polyacetal resin composition copolymer

| | Examples | | | | | | | | Comparative Examples |
|---|---|---|---|---|---|---|---|---|---|
| | 1-1 | 1-2 | 1-3 | 1-4 | 1-5 | 1-6 | 1-7 | 1-8 | 1-1 |
| Part by weight of stabilized copolymer a | a-1 100 | a-1 100 | a-1 100 | a-1 100 | a-1 100 | a-1 100 | a-1 100 | a-4 100 | a-T 100 |
| Part by weight of formaldehyde suppressor b | b-1 0.03 | b-2 0.3 | b-3 0.5 | b-4 0.1 | b-5 0.1 | b-6 0.05 | b-7 0.05 | b-3 0.5 | b-1 0.03 |
| Part by weight of antioxidant c | c-1 0.2 | c-2 0.2 | c-2 0.2 | c-2 0.2 | — | — | c-2 0.2 | c-2 0.2 | c-1 0.2 |
| Part by weight of processing stabilizer d | d-1 0.2 | d-1 0.2 | d-1 0.2 | d-2 0.2 | d-3 0.2 | d-3 0.2 | d-4 0.25 | d-1 0.25 | d-1 0.2 |
| Part by weight of thermostabilizer e | e-1 0.1 | e-1 0.1 | e-1 0.1 | e-2 0.03 | e-3 0.1 | — | e-4 0.1 | e-1 0.1 | e-1 0.1 |
| Amount of formaldehyde generated in wet state μg/cm² | 0.33 | 0.17 | 0.08 | 0.04 | 0.04 | 0.04 | 0.48 | 0.09 | 0.94 |
| Amount of formaldehyde generated in dry state μg/cm² | 0.64 | 0.20 | 0.08 | 0.02 | 0.03 | 0.01 | 2.65 | 0.08 | 2.41 |

TABLE 3

Stabilized polyacetal copolymer

| | Manufacture Examples | | | | | | | | | Comparative Manufacture Examples | |
|---|---|---|---|---|---|---|---|---|---|---|---|
| | 2-I-1 | 2-I-2 | 2-I-3 | 2-I-4 | 2-I-5 | 2-I-6 | 2-I-7 | 2-I-8 | 2-I-9 | 2-1 | 2-2 |
| Quaternary ammonium salt | I-A-1 | I-A-2 | I-A-3 | I-A-4 | I-A-5 | I-A-6 | I-A-1 | I-A-1 | I-A-1 | TEA | A-I |
| Stabilized copolymer | I-a-1 | I-a-2 | I-a-3 | I-a-4 | I-a-5 | I-a-6 | I-a-7 | I-a-8 | I-a-9 | a-T | a-I |
| Amount of terminal group of hemiacetal (mmol/kg) | 0.5 | 0.6 | 0.5 | 0.5 | 0.5 | 0.6 | 0.5 | 0.5 | 0.4 | 1.7 | 0.4 |

TABLE 3-continued

Stabilized polyacetal copolymer

| | Manufacture Examples | | | | | | | | | Comparative Manufacture Examples | |
|---|---|---|---|---|---|---|---|---|---|---|---|
| | 2-I-1 | 2-I-2 | 2-I-3 | 2-I-4 | 2-I-5 | 2-I-6 | 2-I-7 | 2-I-8 | 2-I-9 | 2-1 | 2-2 |
| Amount of terminal group of formyl (mmol/kg) | 0 | 0 | 0.1 | 0 | 0 | 0.3 | 0 | 0 | 0 | 1.4 | 0.1 |
| Amount of unstable terminal (weight %) | 0.15 | 0.16 | 0.17 | 0.15 | 0.16 | 0.22 | 0.15 | 0.16 | 0.16 | 0.74 | 0.22 |
| Odor property | ○ | ○ | ○ | ○ | ○ | Δ | ○ | ○ | ○ | X | X |

TABLE 4

Amount of formaldehyde generated from stabilized polyacetal resin composition copolymer

| | Examples | | | | | | | Comparative Examples |
|---|---|---|---|---|---|---|---|---|
| | 2-I-1 | 2-I-2 | 2-I-3 | 2-I-4 | 2-I-5 | 2-I-6 | 2-I-7 | 2-1 |
| Part by weight of stabilized copolymer a | I-a-1 100 | I-a-1 100 | I-a-1 100 | I-a-1 100 | I-a-1 100 | I-a-1 100 | I-a-1 100 | a-T 100 |
| Part by weight of formaldehyde scavenger b | b-1 0.03 | b-2 0.3 | b-3 0.5 | b-4 0.1 | b-5 0.1 | b-6 0.05 | b-7 0.05 | b-1 0.03 |
| Part by weight of antioxidant c | c-1 0.2 | c-2 0.2 | c-2 0.2 | c-2 0.2 | — | — | c-2 0.2 | c-1 0.2 |
| Part by weight of processing stabilizer d | d-1 0.2 | d-1 0.2 | d-1 0.2 | d-2 0.2 | d-3 0.2 | d-3 0.2 | d-4 0.25 | d-1 0.2 |
| Part by weight of thermostabilizer e | e-1 0.1 | e-1 0.1 | e-1 0.1 | e-2 0.03 | e-3 0.1 | — | e-4 0.1 | e-1 0.1 |
| Amount of formaldehyde generated in wet state μg/cm² | 0.34 | 0.18 | 0.08 | 0.04 | 0.04 | 0.04 | 0.51 | 0.94 |
| Amount of formaldehyde generated in dry state μg/cm² | 0.66 | 0.20 | 0.08 | 0.02 | 0.03 | 0.01 | 2.70 | 2.41 |

TABLE 5

Stabilized polyacetal copolymer

| | Manufacture Examples | | | | | | | | | | | Comparative Manufacture Examples | |
|---|---|---|---|---|---|---|---|---|---|---|---|---|---|
| | 2-II-1 | 2-II-2 | 2-II-3 | 2-II-4 | 2-II-5 | 2-II-6 | 2-II-7 | 2-II-8 | 2-II-9 | 2-II-10 | 2-II-11 | 2-1 | 2-2 |
| Quaternary ammonium salt | II-A-1 | II-A-2 | II-A-3 | II-A-4 | II-A-5 | II-A-6 | II-A-7 | II-A-1 | II-A-1 | II-A-1 | II-A-1 | TEA | A-I |
| Stabilized copolymer | II-a-1 | II-a-2 | II-a-3 | II-a-4 | II-a-5 | II-a-6 | II-a-7 | II-a-1 | II-a-1 | II-a-1 | II-a-1 | a-T | a-I |
| Amount of terminal group of hemiacetal (mmol/kg) | 0.4 | 0.6 | 0.4 | 0.4 | 0.4 | 0.4 | 0.5 | 0.6 | 0.3 | 0.4 | 0.3 | 1.7 | 0.4 |
| Amount of terminal group of formyl (mmol/kg) | 0.1 | 0.1 | 0.3 | 0.1 | 0.1 | 0.2 | 0.3 | 0.3 | 0.1 | 0.1 | 0 | 1.4 | 0.1 |
| Amount of unstable terminal (weight %) | 0.19 | 0.16 | 0.19 | 0.18 | 0.19 | 0.20 | 0.19 | 0.22 | 0.16 | 0.18 | 0.17 | 0.74 | 0.22 |
| Odor property | ○ | ○ | ○ | ○ | ○ | ○ | ○ | Δ | ○ | ○ | ○ | X | X |

TABLE 6

Amount of formaldehyde generated from stabilized polyacetal resin composition copolymer

| | Examples | | | | | | | Comparative Examples |
|---|---|---|---|---|---|---|---|---|
| | 2-II-1 | 2-II-2 | 2-II-3 | 2-II-4 | 2-II-5 | 2-II-6 | 2-II-7 | 2-2-1 |
| Part by weight of stabilized copolymer a | II-a-1 100 | II-a-1 100 | II-a-1 100 | II-a-1 100 | II-a-1 100 | II-a-1 100 | II-a-1 100 | a-T 100 |
| Part by weight of formaldehyde scavenger b | b-1 0.03 | b-2 0.3 | b-3 0.5 | b-4 0.1 | b-5 0.1 | b-6 0.05 | b-7 0.05 | b-1 0.03 |
| Part by weight of antioxidant c | c-1 0.2 | c-2 0.2 | c-2 0.2 | c-2 0.2 | — | — | c-2 0.2 | c-1 0.2 |
| Part by weight of processing stabilizer d | d-1 0.2 | d-1 0.2 | d-1 0.2 | d-2 0.2 | d-3 0.2 | d-3 0.2 | d-4 0.25 | d-1 0.2 |
| Part by weight of thermostabilizer e | e-1 0.1 | e-1 0.1 | e-1 0.1 | e-2 0.03 | e-3 0.1 | — | e-4 0.1 | e-1 0.1 |
| Amount of formaldehyde generated in wet state μg/cm$^2$ | 0.35 | 0.18 | 0.08 | 0.03 | 0.04 | 0.03 | 0.50 | 0.94 |
| Amount of formaldehyde generated in dry state μg/cm$^2$ | 0.68 | 0.22 | 0.09 | 0.02 | 0.04 | 0.01 | 2.70 | 2.41 |

TABLE 7

| | Manufacture Examples | | | | | | | | Comparative Manufacture Examples | |
|---|---|---|---|---|---|---|---|---|---|---|
| | 3-i-1 | 3-i-2 | 3-i-3 | 3-i-4 | 3-i-5 | 3-i-6 | 3-i-7 | 3-i-8 | 3-1 | 3-2 |
| Quaternary ammonium salt | i-A-1 | i-A-2 | i-A-3 | i-A-1 | i-A-1 | i-A-1 | i-A-1 | i-A-2 | TEA | A-I |
| Stabilized copolymer | i-a-1 | i-a-2 | i-a-3 | i-a-1 | i-a-1 | i-a-1 | i-a-2 | i-a-1 | a-T | a-I |
| Amount of terminal group of hemiacetal (mmol/kg) | 0.4 | 0.3 | 0.4 | 0.5 | 0.4 | 0.4 | 0.4 | 0.4 | 1.7 | 0.4 |
| Amount of terminal group of formyl (mmol/kg) | 0.1 | 0.1 | 0.2 | 0.4 | 0.1 | 0.1 | 0.1 | 0 | 1.4 | 0.1 |
| Amount of unstable terminal (% by weight) | 0.18 | 0.16 | 0.17 | 0.22 | 0.20 | 0.19 | 0.17 | 0.18 | 0.74 | 0.22 |
| Odor property | ○ | ○ | ○ | Δ | ○ | ○ | ○ | ○ | X | X |

TABLE 8

| | Examples | | | | | | | Comparative Examples |
|---|---|---|---|---|---|---|---|---|
| | 3-i-1 | 3-i-2 | 3-i-3 | 3-i-4 | 3-i-5 | 3-i-6 | 3-i-7 | 3-1 |
| Parts by weight of stabilized copolymer a | i-a-1 100 | i-a-1 100 | i-a-1 100 | i-a-1 100 | i-a-1 100 | i-a-1 100 | i-a-1 100 | a-T 100 |
| Parts by weight of formaldehyde scavenger b | b-1 0.03 | b-2 0.3 | b-3 0.5 | b-4 0.1 | b-5 0.1 | b-6 0.05 | b-7 0.05 | b-1 0.03 |
| Parts by weight of antioxidant c | c-1 0.2 | c-2 0.2 | c-2 0.2 | c-2 0.2 | — | — | c-2 0.2 | c-1 0.2 |
| Parts by weight of processing stabilizer d | d-1 0.2 | d-1 0.2 | d-1 0.2 | d-2 0.2 | d-3 0.2 | d-3 0.2 | d-4 0.25 | d-1 0.2 |
| Parts by weight of thermostabilizer e | e-1 0.1 | e-1 0.1 | e-1 0.1 | e-2 0.03 | e-3 0.1 | — | e-4 0.1 | e-1 0.1 |
| Amount of generated formaldehyde in a wet state μg/cm$^2$ | 0.34 | 0.18 | 0.08 | 0.04 | 0.04 | 0.04 | 0.47 | 0.94 |
| Amount of generated formaldehyde in a dry state μg/cm$^2$ | 0.66 | 0.21 | 0.08 | 0.02 | 0.03 | 0.01 | 2.67 | 2.41 |

TABLE 9

|  | Manufacture Examples | | | | | | | | | Comparative Manufacture Example | |
| --- | --- | --- | --- | --- | --- | --- | --- | --- | --- | --- | --- |
|  | 3-ii-1 | 3-ii-2 | 3-ii-3 | 3-ii-4 | 3-ii-5 | 3-ii-6 | 3-ii-7 | 3-ii-8 | 3-ii-9 | 3-1 | 3-2 |
| Quaternary ammonium salt | ii-A-1 | ii-A-2 | ii-A-3 | ii-A-4 | ii-A-5 | ii-A-6 | ii-A-1 | ii-A-2 | ii-A-1 | TEA | A-I |
| Stabilized copolymer | ii-a-1 | ii-a-2 | ii-a-3 | ii-a-4 | ii-a-5 | ii-a-6 | ii-a-1 | ii-a-2 | ii-a-1 | a-T | a-I |
| Amount of terminal group of hemiacetal (mmol/kg) | 0.4 | 0.2 | 0.5 | 0.4 | 0.5 | 0.6 | 0.4 | 0.3 | 0.4 | 1.7 | 0.4 |
| Amount of terminal group of formyl (mmol/kg) | 0.1 | 0.1 | 0.1 | 0.2 | 0.3 | 0.3 | 0 | 0 | 0 | 1.4 | 0.1 |
| Amount of unstable terminal (% by weight) | 0.17 | 0.18 | 0.19 | 0.16 | 0.18 | 0.23 | 0.16 | 0.17 | 0.15 | 0.74 | 0.22 |
| Irritating odor | ○ | ○ | ○ | ○ | ○ | ○ | ○ | ○ | ○ | X | X |

TABLE 10

|  | Examples | | | | | | | Comparative Examples |
| --- | --- | --- | --- | --- | --- | --- | --- | --- |
|  | 3-ii-1 | 3-ii-2 | 3-ii-3 | 3-ii-4 | 3-ii-5 | 3-ii-6 | 3-ii-7 | 3-1 |
| Parts by weight of stabilized copolymer a | ii-a-1 | ii-a-1 | ii-a-1 | ii-a-1 | ii-a-1 | ii-a-1 | ii-a-2 | a-T |
|  | 100 | 100 | 100 | 100 | 100 | 100 | 100 | 100 |
| Parts by weight of formaldehyde scavenger b | b-1 | b-2 | b-3 | b-4 | b-5 | b-6 | b-7 | b-1 |
|  | 0.03 | 0.3 | 0.5 | 0.1 | 0.1 | 0.05 | 0.05 | 0.03 |
| Parts by weight of antioxidant c | c-1 | c-2 | c-2 | c-2 | — | — | c-2 | c-1 |
|  | 0.2 | 0.2 | 0.2 | 0.2 |  |  | 0.2 | 0.2 |
| Parts by weight of processing stabilizer d | d-1 | d-1 | d-1 | d-2 | d-3 | d-3 | d-4 | d-1 |
|  | 0.2 | 0.2 | 0.2 | 0.2 | 0.2 | 0.2 | 0.25 | 0.2 |
| Parts by weight of thermostabilizer e | e-1 | e-1 | e-1 | e-2 | e-3 | — | e-4 | e-1 |
|  | 0.1 | 0.1 | 0.1 | 0.03 | 0.1 |  | 0.1 | 0.1 |
| Amount of generated formaldehyde in a wet state μg/cm$^2$ | 0.36 | 0.17 | 0.08 | 0.04 | 0.04 | 0.04 | 0.47 | 0.94 |
| Amount of generated formaldehyde in a dry state μg/cm$^2$ | 0.69 | 0.19 | 0.09 | 0.02 | 0.02 | 0.01 | 2.60 | 2.41 |

TABLE 11

|  | Manufacture Examples | | | | | | | | Comparative Manufacture Examples | |
| --- | --- | --- | --- | --- | --- | --- | --- | --- | --- | --- |
|  | 3-iii-1 | 3-iii-2 | 3-iii-3 | 3-iii-4 | 3-iii-5 | 3-iii-6 | 3-iii-7 | 3-iii-8 | 3-1 | 3-2 |
| Quaternary ammonium salt | iii-A-1 | iii-A-2 | iii-A-3 | iii-A-4 | iii-A-5 | iii-A-6 | iii-A-7 | iii-A-1 | TEA | A-I |
| Stabilized copolymer | iii-a-1 | iii-a-2 | iii-a-3 | iii-a-4 | iii-a-5 | iii-a-6 | iii-a-7 | iii-a-1 | a-T | a-I |
| Amount of terminal group of hemiacetal (mmol/kg) | 0.6 | 0.5 | 0.5 | 0.6 | 0.4 | 0.4 | 0.4 | 0.5 | 1.7 | 0.4 |
| Amount of terminal group of formyl (mmol/kg) | 0 | 0 | 0.2 | 0.4 | 0.1 | 0 | 0.1 | 0 | 1.4 | 0.1 |
| Amount of unstable terminal (% by weight) | 0.20 | 0.18 | 0.19 | 0.23 | 0.20 | 0.17 | 0.18 | 0.18 | 0.74 | 0.22 |
| PC deterioration property | ○ | ○ | ○ | ○ | ○ | ○ | ○ | ○ | ○ | X |
| Irritating odor | ○ | ○ | ○ | Δ | ○ | ○ | ○ | ○ | X | X |

TABLE 12

|  | Examples | | | | | | | Comparative Examples |
| --- | --- | --- | --- | --- | --- | --- | --- | --- |
|  | 3-iii-1 | 3-iii-2 | 3-iii-3 | 3-iii-4 | 3-iii-5 | 3-iii-6 | 3-iii-7 | 3-1 |
| Parts by weight of stabilized copolymer a | iii-a-1 | iii-a-6 | iii-a-1 | iii-a-1 | iii-a-1 | iii-a-1 | iii-a-1 | a-T |
|  | 100 | 100 | 100 | 100 | 100 | 100 | 100 | 100 |
| Parts by weight of formaldehyde scavenger b | b-1 | b-2 | b-3 | b-4 | b-5 | b-6 | b-7 | b-1 |
|  | 0.03 | 0.3 | 0.5 | 0.1 | 0.1 | 0.05 | 0.05 | 0.03 |
| Parts by weight of antioxidant c | c-1 | c-2 | c-2 | c-2 | — | — | c-2 | c-1 |
|  | 0.2 | 0.2 | 0.2 | 0.2 |  |  | 0.2 | 0.2 |
| Parts by weight of | d-1 | d-1 | d-1 | d-2 | d-3 | d-3 | d-4 | d-1 |

TABLE 12-continued

|  | Examples | | | | | | | Comparative Examples |
|---|---|---|---|---|---|---|---|---|
|  | 3-iii-1 | 3-iii-2 | 3-iii-3 | 3-iii-4 | 3-iii-5 | 3-iii-6 | 3-iii-7 | 3-1 |
| processing stabilizer d | 0.2 | 0.2 | 0.2 | 0.2 | 0.2 | 0.2 | 0.25 | 0.2 |
| Parts by weight of thermostabilizer e | e-1 | e-1 | e-1 | e-2 | e-3 | — | e-4 | e-1 |
|  | 0.1 | 0.1 | 0.1 | 0.03 | 0.1 |  | 0.1 | 0.1 |
| Amount of generated formaldehyde in a wet state $\mu g/cm^2$ | 0.38 | 0.18 | 0.08 | 0.04 | 0.04 | 0.04 | 0.53 | 0.94 |
| Amount of generated formaldehyde in a dry state $\mu g/cm^2$ | 0.72 | 0.20 | 0.09 | 0.03 | 0.03 | 0.02 | 2.76 | 2.41 |

TABLE 13

|  | Manufacture Examples | | | | | | Comparative Manufacture Examples | |
|---|---|---|---|---|---|---|---|---|
|  | 3-v-1 | 3-v-2 | 3-v-3 | 3-v-4 | 3-v-5 | 3-v-6 | 3-1 | 3-2 |
| Quaternary ammonium salt | v-A-1 | v-A-2 | v-A-3 | v-A-4 | v-A-5 | v-A-6 | TEA | A-I |
| Stabilized copolymer | v-a-1 | v-a-2 | v-a-3 | v-a-4 | v-a-5 | v-a-6 | a-T | a-I |
| Amount of terminal group of hemiacetal (mmol/kg) | 0.6 | 0.5 | 0.5 | 0.5 | 0.4 | 0.4 | 1.7 | 0.4 |
| Amount of terminal group of formyl (mmol/kg) | 0.1 | 0.1 | 0.12 | 0.3 | 0.1 | 0 | 1.4 | 0.1 |
| Amount of unstable terminal (% by weight) | 0.20 | 0.19 | 0.18 | 0.19 | 0.18 | 0.17 | 0.74 | 0.22 |
| Odor property | ○ | ○ | ○ | ○ | ○ | ○ | X | X |

TABLE 14

|  | Examples | | | | | | | Comparative Examples |
|---|---|---|---|---|---|---|---|---|
|  | 3-v-1 | 3-v-2 | 3-v-3 | 3-v-4 | 3-v-5 | 3-v-6 | 3-v-7 | 3-1 |
| Parts by weight of stabilized copolymer a | v-a-6 | v-a-6 | v-a-3 | v-a-6 | v-a-6 | v-a-6 | v-a-6 | a-T |
|  | 100 | 100 | 100 | 100 | 100 | 100 | 100 | 100 |
| Parts by weight of formaldehyde scavenger b | b-1 | b-2 | b-3 | b-4 | b-5 | b-6 | b-7 | b-1 |
|  | 0.03 | 0.3 | 0.5 | 0.1 | 0.1 | 0.05 | 0.05 | 0.03 |
| Parts by weight of antioxidant c | c-1 | c-1 | c-1 | c-1 | — | — | c-2 | c-1 |
|  | 0.2 | 0.2 | 0.2 | 0.2 |  |  | 0.2 | 0.2 |
| Parts by weight of processing stabilizer d | d-1 | d-1 | d-1 | d-2 | d-3 | d-3 | d-4 | d-1 |
|  | 0.2 | 0.2 | 0.2 | 0.2 | 0.2 | 0.2 | 0.25 | 0.2 |
| Parts by weight of thermostabilizer e | e-1 | e-1 | e-1 | e-2 | e-3 | — | e-4 | e-1 |
|  | 0.1 | 0.1 | 0.1 | 0.03 | 0.1 |  | 0.1 | 0.1 |
| Amount of generated formaldehyde in a wet state $\mu g/cm^2$ | 0.35 | 0.19 | 0.08 | 0.05 | 0.04 | 0.05 | 0.49 | 0.94 |
| Amount of generated formaldehyde in a dry state $\mu g/cm^2$ | 0.67 | 0.23 | 0.10 | 0.02 | 0.03 | 0.01 | 2.69 | 2.41 |

The invention claimed is:

1. A method of manufacturing a stabilized polyacetal resin, comprising the steps of:
providing a polyacetal resin having an unstable terminal group, the polyacetal resin being the copolymerization reaction product of trioxane as a main monomer with cyclic ether and/or cyclic formal as a comonomer in the presence of a cationic polymerization catalyst, and applying a heat treatment to the polyacetal resin in the presence of an unstable terminal group decomposer selected from the following Group I, Group II, and Group III, thereby decreasing the unstable terminal group:
unstable terminal group decomposer of Group I:
(I) a quaternary ammonium salt of an acidic cyclic amide compound;
unstable terminal decomposer of group II:
(II) a quaternary ammonium salt of a polycarboxylic acid intramolecularly having four or more carboxyl groups and/or a quaternary ammonium salt of an aminocarboxylic acid intramolecularly having one or more carboxyl groups;
unstable terminal group decomposer of Group III:
(III) a quaternary ammonium salt, wherein a compound providing a counter-anion of a quaternary ammonium salt is at least one selected from the group consisting of the following (i) and (ii):
(i) an acidic enol-based compound; and
(ii) an acidic azole based compound.

2. The method of manufacturing a stabilized polyacetal resin according to claim 1, wherein the unstable terminal group decomposer of Group I is a quaternary ammonium salt represented by the following formula (1-1) below:

$$[R^1R^2R^3R^4N^+]_n Y^{n-} \quad (1\text{-}1)$$

wherein, $R^1$, $R^2$, $R^3$ and $R^4$ independently represent a hydrocarbon group having 1 to 20 carbon atoms, and the hydrocarbon group is a linear or branched alkyl group, cycloalkyl group, aryl group, aralkyl group or alkylaryl group; the hydrocarbon group may have a substituent, the substituent including hydroxyl group, acyl group, acyloxy group, alkoxy group, alkoxycarbonyl group, carboxyl group, amino group, amide group, vinyl group, allyl group, hydroxyalkyloxy group, alkoxyalkyloxy group or a halogen atom; n represents an integer from 1 to 5; $Y^{n-}$ is a counter anion, whose provider compound is an acidic cyclic amide compound; and n number of $[R^1R^2R^3R^4N^+]$s may differ from each other.

3. The method of manufacturing a stabilized polyacetal resin according to claim 1, wherein the unstable terminal group decomposer of Group I is a quaternary ammonium salt represented by the following formula (1-2):

$$[R^1R^2R^3R^4N^+]_n Y^{j-} \cdot W^{k-} \tag{1-2}$$

wherein, $R^1$, $R^2$, $R^3$ and $R^4$ independently represent a hydrocarbon group having 1 to 20 carbon atoms, and the hydrocarbon group is a linear or branched alkyl group, cycloalkyl group, aryl group, aralkyl group or alkylaryl group; the hydrocarbon group may have a substituent, the substituent including hydroxy group, acyl group, acyloxy group, alkoxy group, alkoxycarbonyl group, carboxyl group, amino group, amide group, vinyl group, allyl group, hydroxyalkyloxy group, alkoxyalkyloxy group or a halogen atom; n represents an integer from 1 to 5; $Y^{j-}$ and $W^{k-}$ are counter anions; j+k is n; j represents an integer from 1 to 5; $Y^{j-}$ is an anion derived from an acidic cyclic amide compound; $W^{k-}$ is at least one anion selected from the group consisting of hydroxide anion, an anion(s) derived from a fatty acid having 1 to 20 carbon atoms, carbonate anion and borate anion; and n number of $[R^1R^2R^3R^4N^+]$s may differ from each other.

4. The method of manufacturing a stabilized polyacetal resin according to claim 1, wherein the acidic cyclic amide compound of an unstable terminal group decomposer of Group I is an acidic cyclic urea compound.

5. The method of manufacturing a stabilized polyacetal resin according to claim 1, wherein the acidic cyclic amide compound of an unstable terminal group decomposer of Group I is at least one selected from the group consisting of (iso)cyanuric acid, 5,5-dimethylhydantoin and phthalimide.

6. The method of manufacturing a stabilized polyacetal resin according to claim 1, wherein the unstable terminal group decomposer of Group II is a quaternary ammonium salt represented by the following formula (2-1):

$$[R^1R^2R^3R^4N^+]_n Y^{n-} \tag{2-1}$$

wherein, $R^1$, $R^2$, $R^3$ and $R^4$ independently represent a hydrocarbon group having 1 to 20 carbon atoms, and the hydrocarbon group is a linear or branched alkyl group, cycloalkyl group, aryl group, aralkyl group or alkylaryl group; the hydrocarbon group may have a substituent, the substituent including hydroxy group, acyl group, acyloxy group, alkoxy group, alkoxycarbonyl group, carboxyl group, amino group, amide group, vinyl group, allyl group, hydroxyalkyloxy group, alkoxyalkyloxy group or a halogen atom; n represents an integer of 4 or more in the case of polycarboxylic acid, and 1 or more in the case of aminocarboxylic acid; $Y^{n-}$ is a counter anion, whose provider compound is a polycarboxylic or aminocarboxylic acid; n number of $[R^1R^2R^3R^4N^+]$s may differ from each other; and $Y^{n-}$ may be anions derived from two or more kinds of polycarboxylic acid and/or aminocarboxylic acid or double salt and complex salt thereof.

7. The method of manufacturing a stabilized polyacetal resin according to claim 1, wherein the unstable terminal group decomposer of Group II is a quaternary ammonium salt represented by the following formula (2-2):

$$[R^1R^2R^3R^4N^+]_n Y^{j-} \cdot W^{k-} \tag{2-2}$$

wherein, $R^1$, $R^2$, $R^3$ and $R^4$ independently represent a hydrocarbon group having 1 to 20 carbon atoms, and the hydrocarbon group is a linear or branched alkyl group, cycloalkyl group, aryl group, aralkyl group or alkylaryl group; the hydrocarbon group may have a substituent, the substituent including hydroxy group, acyl group, acyloxy group, alkoxy group, alkoxycarbonyl group, carboxyl group, amino group, amide group, vinyl group, allyl group, hydroxyalkyloxy group, alkoxyalkyloxy group or a halogen atom; n represents an integer of 4 or more in the case of polycarboxylic acid, and 1 or more in the case of aminocarboxylic acid; $Y^{j-}$ and $W^{k-}$ are counter anions; j+k is n; j represents an integer from 1 to 10,000; $Y^{j-}$ is an anion derived from polycarboxylic acid and/or aminocarboxylic acid; $W^{k-}$ is at least one anion selected from the group consisting of hydroxide anion, anion derived from a fatty acid having 1 to 20 carbon atoms, carbonate anion, bicarbonate anion and borate anion; and n number of $[R^1R^2R^3R^4N^+]$s may differ from each other.

8. The method of manufacturing a stabilized polyacetal resin according to claim 1, wherein the polycarboxylic acid of an unstable terminal group decomposer of Group II is a (co)polymer composed of 1,2,3,4-butanetetracarboxylic acid or unsaturated monomer comprising a carboxyl group.

9. The method of manufacturing a stabilized polyacetal resin according to claim 8, wherein the unsaturated monomer comprising a carboxyl group is at least one selected from the group consisting of acrylic acid, methacrylic acid, maleic acid, fumaric acid and itaconic acid.

10. The method of manufacturing a stabilized polyacetal resin according to claim 1, wherein the aminocarboxylic acid of an unstable terminal group decomposer of Group II is an aminocarboxylic acid having 3 to 30 carbon atoms (in which position of the amino group substituted may be on any carbon) and may be N-substituted.

11. The method of manufacturing a stabilized polyacetal resin according to claim 1, wherein the aminocarboxylic acid of an unstable terminal group decomposer of Group II is an optionally N-substituted aminoacetic acid.

12. The method of manufacturing a stabilized polyacetal resin according to claim 1, wherein the aminocarboxylic acid of an unstable terminal group decomposer of Group II has two or more carboxyl groups intramolecularly.

13. The method of manufacturing a stabilized polyacetal resin according to claim 1, wherein the aminocarboxylic acid of an unstable terminal group decomposer of Group II is at least one selected from the group consisting of nitrilotriacetic acid, ethylenediaminetetraacetic acid, diethylenetriaminepentaacetic acid, triethylenediaminehexacetic acid, 1,3-propanediaminetetraacetic acid, glycoletherdiaminetetraacetic acid, dicarboxymethylglutamic acid, ethylenediaminedisuccinic acid, hydroxyethylethylenediaminetriacetic acid, 1,3-diamino-2-hydroxypropanetetraacetic acid and hydroxyethyliminodiacetic acid.

14. The method of manufacturing a stabilized polyacetal resin according to claim 1, wherein the unstable terminal group decomposer of Group III is a quaternary ammonium salt represented by the following formula (3-1) below:

$$[R^1R^2R^3R^4N^+]_n Y^{n-} \tag{3-1}$$

wherein, $R^1$, $R^2$, $R^3$, and $R^4$ independently represent a hydrocarbon group having 1 to 20 carbon atoms, and the hydrocarbon group is a linear or branched alkyl group, cycloalkyl group, aryl group, aralkyl group, or alkylaryl group; the hydrocarbon group may have a substituent, the substituent including hydroxyl group, acyl group, acyloxy group, alkoxy group, alkoxycarbonyl group, carboxyl group, amino group, amide group, vinyl group, allyl group, hydroxyalkyloxy group, alkoxyalkoxy group, or a halogen atom; n represents an integer of one or more; n number of $[R^1R^2R^3R^4N^+]$s may differ from each other; and $Y^{n-}$ is a counter-anion, whose provider compound is at least one selected from the group consisting of the following (i) and (ii):
(i) an acidic enol-based compound; and
(ii) an acidic azole based compound.

15. The method of manufacturing a stabilized polyacetal resin according to claim 1, wherein the unstable terminal group decomposer of Group III is a quaternary ammonium salt represented by the following formula (3-2) below:

(3-2)

wherein, $R^1$, $R^2$, $R^3$, and $R^4$ independently represent a hydrocarbon group having 1 to 20 carbon atoms, and the hydrocarbon group is a linear or branched alkyl group, cycloalkyl group, aryl group, aralkyl group, or alkylaryl group; the hydrocarbon group may have a substituent, the substituent including hydroxyl group, acyl group, acyloxy group, alkoxy group, alkoxycarbonyl group, carboxyl group, amino group, amide group, vinyl group, allyl group, hydroxyalkyloxy group, alkoxyalkoxy group, or a halogen atom; n represents an integer of one or more; $Y^{j-}$ and $W^{k-}$ are counter anions; j+k is n; j represents an integer of one or more;

$Y^{j-}$ is a counter-anion, whose provider compound is at least one selected from the group consisting of the following (i) and (ii):
(i) an acidic enol-based compound; and
(ii) an acidic azole based compound;

$W^{k-}$ is at least one anion selected from the group consisting of hydroxide anion, an anion derived from a fatty acid having 1 to 20 carbon atoms, carbonate anion, bicarbonate anion, and borate anion; and
n number of $[R^1R^2R^3R^4N^+]$s may differ from each other.

16. The method of manufacturing a stabilized polyacetal resin according to claim 1, wherein the above-mentioned acidic enol-based compound (i) is at least one selected from the group consisting of 1,3-diketone and ene-diol compounds.

17. The method of manufacturing a stabilized polyacetal resin according to claim 1, wherein the above-mentioned acidic azole-based compound (ii) is at least one selected from the group consisting of tetrazole, benzotriazole, and xanthine compounds.

18. The method of manufacturing a stabilized polyacetal resin according to claim 2, wherein the $R^1$, $R^2$, $R^3$, and $R^4$ of the above-mentioned formula (1-1) consists of an alkyl group having 1 to 4 carbon atom(s) and/or a hydroxyalkyl group having 2 to 4 carbon atoms.

19. The method of manufacturing a stabilized polyacetal resin according to claim 2, wherein the $R^1R^2R^3R^4N$ is at least one selected from the group consisting of (2-hydroxyethyl) trimethylammonium, (2-hydroxyethyl)triethylammonium and tetramethylammonium.

20. The method of manufacturing a stabilized polyacetal resin according to claim 1, further comprises the step of adding at least one selected from the group consisting of water, antioxidant, tertiary amine, alkaline-earth metal compounds and boric acid, thereby applying a heat treatment under a co-presence thereof.

21. The method of manufacturing a stabilized polyacetal resin according to claim 1, wherein the amount of hemiacetal terminal group is 0.6 mmol/kg or less and/or the amount of formyl terminal group is 0.6 mmol/kg or less in the stabilized polyacetal resin.

22. The method of manufacturing a stabilized polyacetal resin according to claim 1, wherein the heat treatment is conducted in a molten state of the polyacetal resin having an unstable terminal group.

23. The method of manufacturing a stabilized polyacetal resin according to claim 1, wherein the amount of the unstable terminal group decomposer used is calculated on the basis of a nitrogen atom providing a quaternary ammonium at 0.005 to 3.5 mmol per kg of polyacetal resin having an unstable terminal group.

24. The method of manufacturing a stabilized polyacetal resin according to claim 1, wherein the heat treatment temperature is between the melting point of polyacetal resin and 250° C., and the heat treatment time is from 20 seconds to 20 minutes.

25. A stabilized polyacetal resin obtained by the method of manufacturing a stabilized polyacetal resin according to claim 1.

26. A polyacetal resin composition comprising 100 parts by weight of the stabilized polyacetal resin according to claim 25, and
(a) between 0.001 and 5 parts by weight of at least one selected from the group consisting of antioxidant, formaldehyde scavenger, formic acid scavenger, weather resistant stabilizers, light resistant stabilizer, mold release agent and crystal nucleator;
(b) between 0 and 100 parts by weight of at least one selected from the group consisting of filler, reinforcing agent, thermoplastic resin, thermoplastic elastomer, lubricant, sliding agent and electric conduction agent; and
(c) between 0 and 5 parts by weight of colorant.

27. The polyacetal resin composition according to claim 26, comprising as antioxidant hindered phenol-based antioxidant and/or amine-based antioxidant between 0.01 and 1 part by weight to 100 parts by weight of the stabilized polyacetal resin.

28. The polyacetal resin composition according to claim 26 comprising as formaldehyde scavenger at least one selected from the group consisting of aminotriazine compound, urea compound, carboxylic acid hydrazide compound and a polyamide resin between 0.01 and 2 parts by weight to 100 parts by weight of the stabilized polyacetal resin.

29. The polyacetal resin composition according to claim 26, comprising as formic acid scavenger one or more material selected from the group consisting of fatty acid metal salt which may have a hydroxyl group, magnesium hydroxide and magnesium oxide, which may have a hydroxy group, between 0.01 and 0.2 part by weight to 100 parts by weight of the stabilized polyacetal resin.

30. The polyacetal resin composition according to claim 26, comprising as mold release agent one or more selected from the group consisting of fatty acid ester and fatty acid amide each having 12 to 36 carbon atoms between 0.01 and 1.0 part by weight to 100 parts by weight of the stabilized polyacetal resin.

31. A molded article prepared by molding the polyacetal resin composition according to claim 26.

32. The molded article according to claim 31, wherein (1) when keeping the molded article in a sealed space at 80° C. for 24 hours, the amount of formaldehyde generated is 2 μg or less per 1 cm² of surface area of the molded article, and/or (2) when keeping the molded article in a sealed space at 60° C. for three hours under saturated humidity, the amount of formaldehyde generated is 0.8 μg or less per 1 cm² of surface area of the molded article.

33. The molded article according to claim 31, wherein the molded article is at least one selected from automobile parts, electric and electronic components, building materials and piping parts, livingware parts, cosmetic parts and medical article parts.

* * * * *